(12) United States Patent
Padir et al.

(10) Patent No.: US 12,454,067 B2
(45) Date of Patent: Oct. 28, 2025

(54) SYSTEMS AND METHODS FOR ROBOTIC GRIPPERS WITH FIBER OPTIC SPECTROSCOPY

(71) Applicant: Northeastern University, Boston, MA (US)

(72) Inventors: Taskin Padir, Westborough, MA (US); Akshay Vaidya, Westford, MA (US); Hillel Hochsztein, Brighton, MA (US); Nathaniel Hanson, Boston, MA (US); Kristen Dorsey, Roslindale, MA (US); Joel B. Willick, Olivette, MO (US); Tarik Kelestemur, Boston, MA (US); Deniz Erdogmus, Winchester, MA (US)

(73) Assignee: Northeastern University, Boston, MA (US)

( * ) Notice: Subject to any disclaimer, the term of this patent is extended or adjusted under 35 U.S.C. 154(b) by 187 days.

(21) Appl. No.: 18/165,707

(22) Filed: Feb. 7, 2023

(65) Prior Publication Data

US 2023/0249368 A1    Aug. 10, 2023

Related U.S. Application Data

(60) Provisional application No. 63/267,677, filed on Feb. 8, 2022.

(51) Int. Cl.
*B25J 19/02* (2006.01)
*B25J 15/08* (2006.01)
*G01N 21/25* (2006.01)

(52) U.S. Cl.
CPC ............. *B25J 19/025* (2013.01); *B25J 15/08* (2013.01); *G01N 21/255* (2013.01)

(58) Field of Classification Search
CPC ........ B25J 19/025; B25J 15/08; B25J 9/1612; B25J 13/087; B25J 15/12; G01N 21/255;
(Continued)

(56) References Cited

U.S. PATENT DOCUMENTS 6,847,447 B2 * 1/2005 Ozanich ................. G01J 3/524
356/402
9,878,444 B1 * 1/2018 Harrington ............. A47F 13/06
(Continued)

OTHER PUBLICATIONS

Alspach, A., et al., "Soft-bubble: A highly compliant desnse geometry tactile sensor for robot manipulation," (Apr. 14-18, 2019), (Year: 2019).*

(Continued)

*Primary Examiner* — Michael P LaPage
*Assistant Examiner* — Kemaya Nguyen
(74) *Attorney, Agent, or Firm* — Hamilton, Brook, Smith & Reynolds, P.C.

(57) ABSTRACT

Embodiments include systems for determining one or more properties of an object. In an embodiment, a system includes a gripping element, a light source, a probe element including an optical fiber, a spectrometer, and a processor. The gripping element is configured to grasp the object. The light source is configured to illuminate the object. The probe element is operatively coupled to the gripping element. The optical fiber is configured to transmit reflected light from the object. The spectrometer configured to: (i) receive the transmitted reflected light from the optical fiber and (ii) generate spectral data based on the received transmitted reflected light. The processor is configured to: (i) receive the generated spectral data from the spectrometer and (ii) determine one or more properties of the object based on the received generated spectral data.

16 Claims, 20 Drawing Sheets

(58) Field of Classification Search
CPC ............. G01N 21/3563; G01N 33/025; G01N 2201/08; G01N 2201/1296; G05B 2219/45066
See application file for complete search history.

(56) References Cited

U.S. PATENT DOCUMENTS

| | | | |
|---|---|---|---|
| 2001/0052978 A1* | 12/2001 | Lewis | G01N 21/3563 356/330 |
| 2013/0256534 A1* | 10/2013 | Micheels | G01N 21/8507 250/339.07 |
| 2014/0128992 A1* | 5/2014 | Engeberg | A61F 2/72 623/25 |
| 2017/0225804 A1* | 8/2017 | Hafenrichter | B64F 5/60 |
| 2020/0156261 A1* | 5/2020 | Lin | B25J 15/0023 |
| 2022/0333989 A1* | 10/2022 | Erickson | G01J 3/0291 |

OTHER PUBLICATIONS

Shintake, J., et al., "Soft Robotic Grippers," Advanced Materials, 30, 1707035, pp. 1-33 (2018).
Buckingham, G., et al., "Living in A Material World: How Visual Cues to Material Properties Affect the Way That We Lift Objects and Perceive Their Weight," J Neurophysiol 102: 3111-3118 (2009).
Abraira, V. E., et al., "The Sensory Neurons of Touch," Neuron. Aug. 21; 79(4) pp. 1-41 (2013).
Li, R., et al., "Sensing and Recognizing Surface Textures Using a GelSight Sensor," IEEE Conference on Computer Vision and Pattern Recognition, 1241-1247 (2013).
Wang, Z, et al., "Robot grasp detection using multimodal deep convolutional neural networks," Advances in Mechanical Engineering, vol. 8(9) 1-12 (2016).
Abad, A. C., "Visuotactile Sensors With Emphasis on GelSight Sensor: A Review," IEEE Sensors Journal, vol. 20, No. 14, pp. 7628-7638 Jul. 15, 2020.
Alspach, A., et al., "Soft-bubble: A highly compliant dense geometry tactile sensor for robot manipulation," (No Date Given).
Serranti, S., et al., "Classification of polyolefins from building and construction waste using NIR hyperspectral imaging system," Resources, Conservation and Recycling 61, pp. 52-58 (2012).
Kokaly, R. F., et al., "USGS Spectral Library Version 7," Data Series 1035, 69 pages (2017).
Nicolai, B. M., et al., "Nondestructive measurement of fruit and vegetable quality by means of NIR spectroscopy: A review," Postharvest Biology and Technology 46, 99-118 (2007).
Schwartz, G, et al., "Recognizing Material Properties from Images," Department of Computer Science, Drexel University, pp. 1-14, Jan. 2018.
Bell, S., et al., "Material Recognition in the Wild with the Materials in Context Database," Department of Computer Science, Cornell University, pp. 1-9, Apr. 2015.
Fleming, R. W., "Visual perception of materials and their properties," Vision Research 94, pp. 62-75 (2014).
Zhao, H., et al., "Optoelectronically innervated soft prosthetic hand via stretchable optical waveguides," Sci. Robot. 1, pp. 1-10 (2016).
Teeple, C. B., et al., "Soft Curvature and Contact Force Sensors for Deep-Sea Grasping via Soft Optical Waveguides," IEEE/RSJ International Conference on Intelligent Robots and Systems (IROS) Madrid, Spain, Oct. 1-5, 2018.
Bai, H., et al., "Stretchable distributed fiber-optic sensors," Science 370, pp. 848-852 (2020).
Solaris® Clear Silicone Encapsulating Rubber, Product Overview, 2 pages, 092721DH (No Date Given).
Dragon Skin™ Series, Addition Cure Silicone Rubber Compounds, Product Overview, 2 pages, 040722-JR (No Date Given).
Ecoflex™ Series Super-Soft, Addition Cure Silicone Rubbers, Product Overview, 2 pages, 041421-DH (No Date Given).
SYLGARD™ 186 Silicone Elastomer, Technical Data Sheet, Dow, Form No. 11-1253-01 C, pp. 1-5, (2017).
Erickson, Z., et al., "Classification of Household Materials via Spectroscopy," IEEE Robotics and Automation Letters. Preprint Version. Accepted Dec. 2018.
Erickson, Z., et al., "Multimodal Material Classification for Robots using Spectroscopy and High Resolution Texture Imaging," Healthcare Robotics Lab, Georgia Institute of Technology (2020).
Nair, L., et al., "Autonomous Tool Construction Using Part Shape and Attachment Prediction," Robotics: Science and Systems Freiburg im Breisgau, Jun. 22-26, 2019.
Cortes, V., et al., "Integration of simultaneous tactile sensing and visible and near-infrared reflectance spectroscopy in a robot gripper for mango quality assessment," Biosystems Engineering 162, 112-123 (2017).
Hanson, N., et al., "Pregrasp Object Material Classification by a Novel Gripper Design with Integrated Spectroscopy," pp. 1-7 Jul. 2, 2022.
Oliveira, M. B., "Hybrid Fabrication of a Soft Bending Actuator With Casting and Additive Manufacturing," Proceedings of the ASME 2019 International Design Engineering Technical Conferences and Computers and Information in Engineering Conference, pp. 1-9 (2019).
Pourdarbani, R., et al., "Non-destructive visible and short-wave near-infrared spectroscopic data estimation of various physicochemical properties of Fuji apple (*Malus pumila*) fruits at different maturation stages," Chemometrics and Intelligent Laboratory Systems 206, pp. 1-10 (2020).
Jenkins, A. L., et al., "Molecularly imprinted polymer sensors for detection in the gas, liquid, and vapor phase," J. Mol. Recognit.; 25: 330-335 (2012).
Weik, M. H., "Computer Science and Communications Dictionary," Spectral Width; SpringerLink, Boston, MA., (2000). https://doi.org/10.1007/1-4020-0613-6_17892.
Jenkins, R., et al., "Energy efficiency of a quartz tungsten halogen lamp: Experimental and numerical approach," Thermal Science and Engineering Progress 13, 11 pages (2019).
Liu, X., et al., "A Kernel Spectral Angle Mapper Algorithm for Remote Sensing Image Classification," IEEE, 6th International Congress on Image and Signal Processing CISP (2013).

* cited by examiner

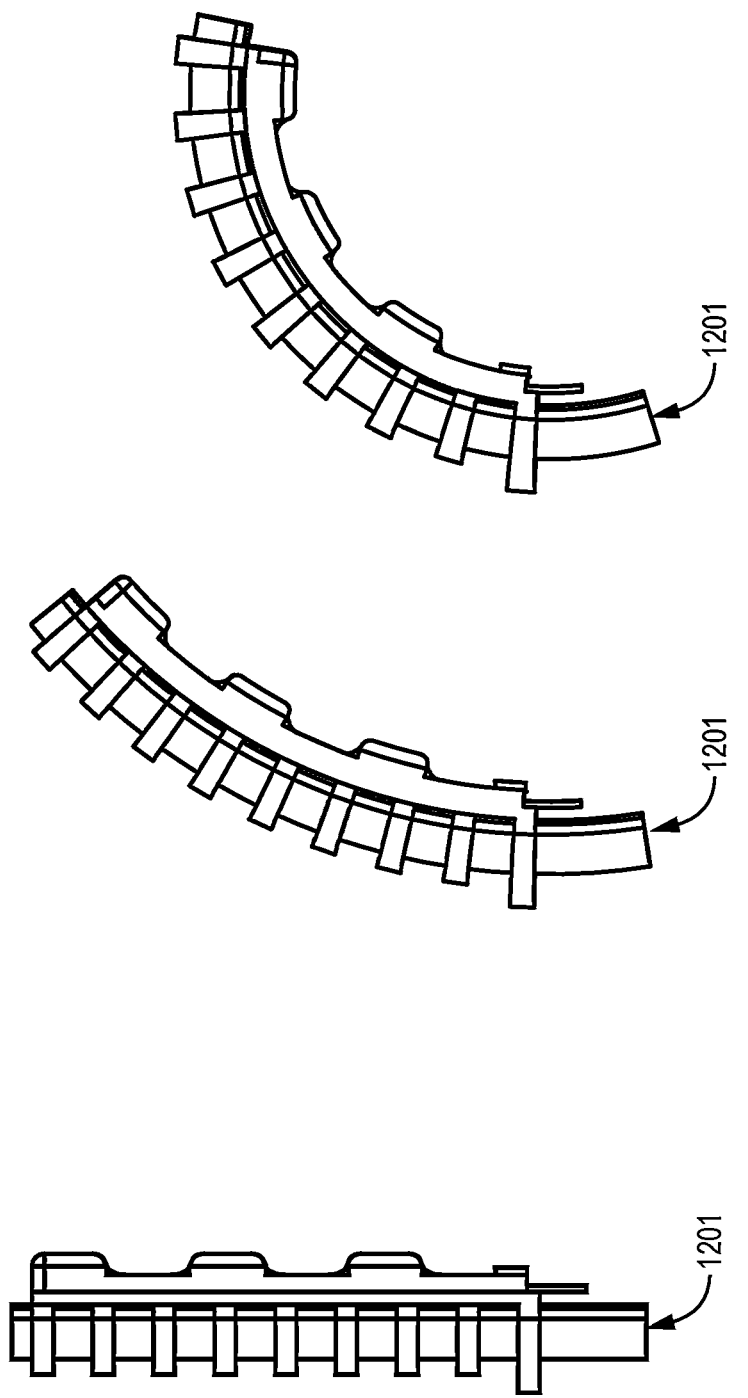

SYSTEMS AND METHODS FOR ROBOTIC GRIPPERS WITH FIBER OPTIC SPECTROSCOPY

RELATED APPLICATION

This application claims the benefit of U.S. Provisional Application No. 63/267,677, filed on Feb. 8, 2022. The entire teachings of the above Application are incorporated herein by reference.

GOVERNMENT SUPPORT

This invention was made with government support under Grant No. 1928654 from the National Science Foundation. The government has certain rights in the invention.

BACKGROUND

The use of robotic gripping devices has increased over time. However, current devices remain inadequate.

SUMMARY

A particular area of inadequacy for robotic gripping devices is a lack of suitable capabilities for in-situ and/or pre-grasp object identification. Embodiments provide a robotic gripper with embedded fiber optic cables which measure reflected light from grasped objects. By analyzing patterns of reflected light, embodiments can differentiate between broad material categories. Knowing a material category of grasped objects, embodiments can enable better handling and sorting performance and analysis of their material properties.

A system for determining one or more properties of an object may include a gripping element, a light source, a probe element, a spectrometer, and a processor. The gripping element may be configured to grasp the object. The light source may be configured to illuminate the object. The probe element may be operatively coupled to the gripping element. Further, the probe element may include an optical fiber, which may be configured to transmit reflected light from the object. The spectrometer may be configured to: (i) receive the transmitted reflected light from the optical fiber and (ii) generate spectral data based on the received transmitted reflected light. The processor may be configured to: (i) receive the generated spectral data from the spectrometer and (ii) determine one or more properties of the object based on the received generated spectral data.

Alternatively, the optical fiber may be further configured to illuminate the object.

The gripping element may include one or more soft gripping fingers. Further, the probe element may include a reflector and a lens at an end of the optical fiber. The lens may be configured to focus light reflected from the object onto the reflector and into the optical fiber. The probe element may further include a gripper pad that embeds at least a portion of the optical fiber, the lens, and the light source. The gripper pad may be an elastomeric gripper pad. Further, the elastomeric gripper pad may be attached to a length of the one or more soft gripping fingers.

The light source may be a full spectrum light source. Further, the full spectrum light source may be a Quartz Tungsten Halogen (QTH) lamp. The transmitted reflected light may include wavelengths in a range of 350-2200 nanometers (nm).

The processor may be further configured to measure a spectral profile of the object based on the received generated spectral data. Further, the one or more properties may include one or more of color, composition, quality, class, material, contents, a chemical property, or a physical property. The processor may be further configured to determine the one or more properties of the object by comparing the spectral profile of the object to a spectral signature in a database. The processor may be further configured to determine the one or more properties of the object based on the spectral data using a machine learning model. Further, the machine learning model may include a logistic model, a support vector machine, or a neural network.

The probe element may further include one or more auxiliary fibers. The system may further include an optical switch operatively coupled to (i) the spectrometer and (ii) the optical fiber and the one or more auxiliary fibers. The optical switch may be configured to switch among the optical fiber and the one or more auxiliary fibers. The spectrometer may be further configured to: (i) receive auxiliary light reflected from the object and transmitted via the one or more auxiliary fibers and (ii) generate auxiliary data based on the received auxiliary light. The processor may be further configured to: (i) receive the generated auxiliary data and (ii) determine the one or more properties of the object based on one or more of received generated spectral data and the received generated auxiliary data. Further, determining the one or more properties of an object based on one or more of received generated spectral data and received generated auxiliary data may include averaging one or more of the received generated spectral data and the received generated auxiliary data.

The gripping element may further include a prosthetic hand that in turn includes the one or more soft gripping fingers.

The gripping element may include one or more rigid gripping fingers.

A computer-implemented method for determining one or more properties of an object may include: illuminating the object; receiving light reflected from the object; generating spectral data based on the received light; and determining one or more properties of the object based on the generated spectral data. Further, determining the one or more properties of the object based on the spectral data may include using a machine learning model.

Further details and example embodiments are described below and in the provisional application as filed, U.S. Provisional Application No. 63/267,677, filed on Feb. 8, 2022, the contents of which are herein incorporated by reference in their entirety.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 12A-12C are simplified diagram views showing different angles of actuation for a soft gripping finger with attached gripper pad.

DETAILED DESCRIPTION

Figure 1:
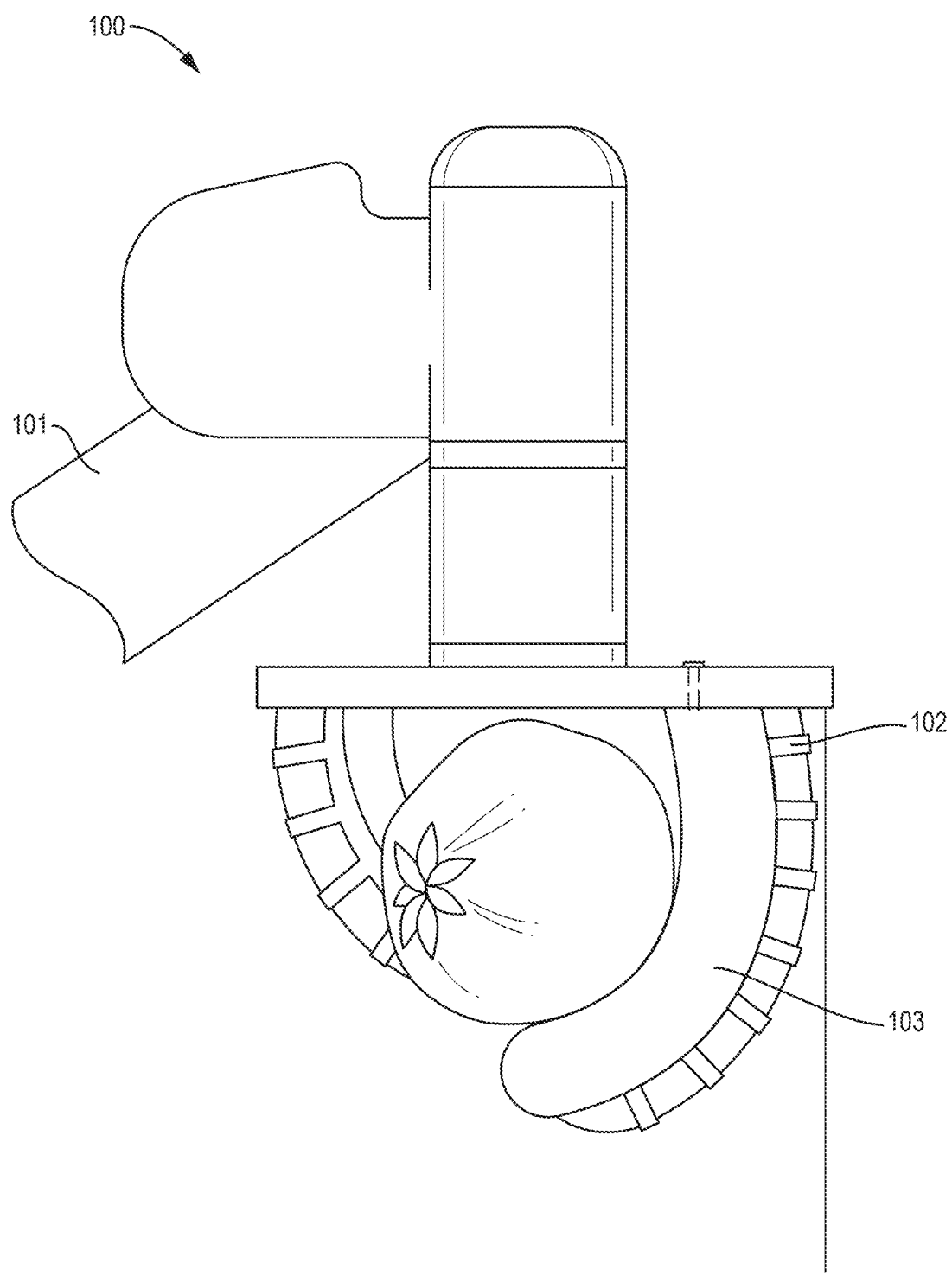
FIG. 1 is an image of a soft gripper.

A description of example embodiments follows.

Soft grippers furnish robots with an ability to manipulate objects of irregular form, or those which might be deformed under direct force from rigid counterparts. Even though soft grippers are highly generalizable grippers for objects varying in size and shape, in-situ object identification is still an open problem in the soft robotics community.

Previous work in soft robotic material sensing has focused on integrating flexible force sensors or optical waveguides to infer object shape and mass from experiential data. In this document, embodiments provide a hybrid-manufactured soft robotic gripper, created using, e.g., 3D printing and casting, with a modular sensing platform capable of collecting high-fidelity spectral information. Embedded full spectrum light sources may be paired with lensed fiber optic cables within an optically clear gel, to collect multi-point spectral reflectivity curves in a Visible to Near Infrared (VNIR) segment of an electromagnetic spectrum.

Embodiments provide a processing pipeline to collect, clean, and merge multiple spectral readings. According to some embodiments, sample readings are gathered from several similarly shaped and textured items to show how spectroscopy benefits soft sensing and outperforms optical waveguides. Integration of spectroscopic data by embodiments presents a promising new sensing modality for soft robots to understand material composition of grasped items, facilitating numerous applications.

Spectroscopy according to embodiments provides an ability to measure material properties of objects without direct contact or destructive testing. This can expedite quality assessment for food processing by saving on time for technicians to pull samples from a processing line and run a myriad of chemical tests. In embodiments, a gripper allows faster identification of out-of-specification products, saving production costs.

Current lab testing is expensive and requires dedicated human labor. In some embodiments, a gripper may automate chemical material analysis via VNIR spectroscopy. Productionized soft grippers are not outfitted with force sensors or other ability to sense material properties.

Subsequent to the filing of U.S. Provisional Application No. 63/267,677, aspects of the invention have been published in Hanson et al., "In-Hand Object Recognition with Innervated Fiber Optic Spectroscopy for Soft Grippers," 2022 *IEEE 5th International Conference on Soft Robotics* (*RoboSoft*), 2022, pp. 852-858 and Hanson et al., "Pregrasp Object Material Classification by a Novel Gripper Design with Integrated Spectroscopy," *arXiv preprint*, 2022, pp. 1-7, both of which are herein incorporated by reference in their entirety.

I. Introduction

Compliant soft robotic grippers are highly effective at handling a variety of object geometries, including pliable objects or those with delicate surfaces. Soft robot manipulators are characterized by a grasp strategy which more evenly distributes applied pressure [1] (bracketed numbers in this document refer to the enumerated list of references hereinbelow). This adaptable grasping form mirrors the versatility of human hands and their ability to change shape to securely lift and carry objects. However, current robot grippers struggle to identify what they have grasped. Humans are proficient at inferring object class and similarity from the object shape, size, weight, and material type. In our interactions with everyday objects, we leverage past encounters with similar objects to reinforce our categorizations and develop inferences into how to handle unknown items [2]. However, we are imbued with a somatosensory system capable of responding to varied tactile stimuli far exceeding the current capabilities of robotic grasping [3].

Recent advances in quantifying object material properties for robot applications have contributed techniques based on human sensory capabilities, including touch and vision. Specifically, in prior work involving direct contact with objects, much attention has been given to visual sensing or texture estimation via an elastomeric sensor mounted on a parallel-plate gripper [4], [5], [6], [7]. A goal in this document is to demonstrate VNIR spectroscopy in tandem with manipulation by a soft gripper, as a step towards improved in-hand object recognition.

Figure 2:
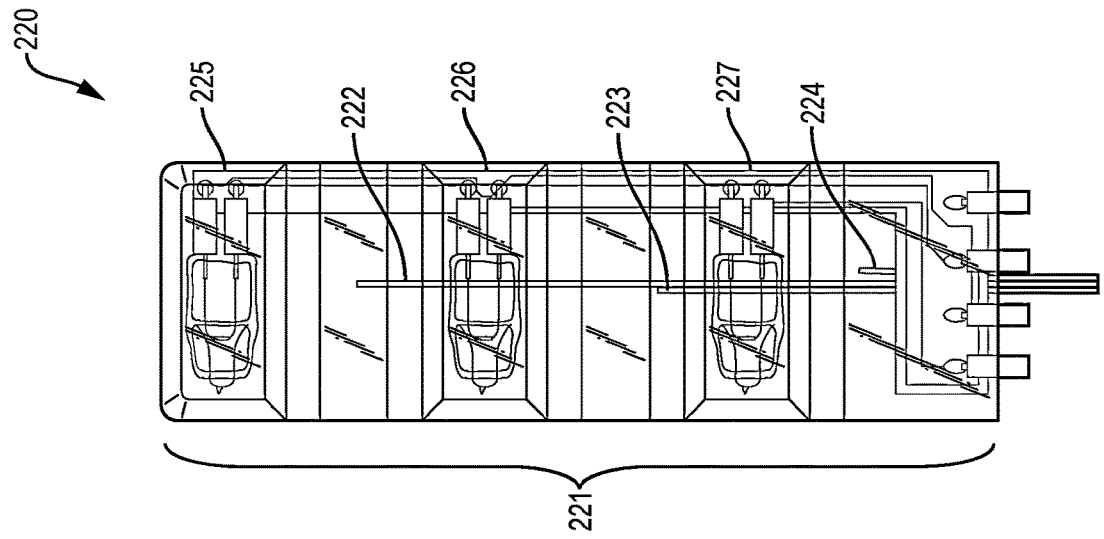
FIG. 2 is an image of a gripper pad according to FIG. 1.

FIG. 1 is an image 100 of a soft gripper 102. Soft gripper 102 may be mounted to a six Degrees of Freedom (DoF) robotic arm 101. A gripper pad 103 may include innervated fiber optic cables and encapsulated full spectrum light sources; gripper pad 103 may further be mounted to soft gripper 102. FIG. 2 is an image 220 of a gripper pad 221. Gripper pad 221 may include fiber optic cables 222, 223, and 224, and bulbs 225, 226, and 227. Soft gripper 102 with gripper pad 103 and/or gripper pad 221 can implement the method 330, described hereinbelow in relation to FIG. 3, to determine one or more properties of an object.

To provide such functionality, a system may include a gripping element, e.g., soft gripper 102. Soft gripper 102 may be configured to grasp an object. The system may further include a light source, e.g., bulb 225, 226, or 227. Bulb 225, 226, or 227 may be configured to illuminate the object. The system may further include a probe element, e.g., gripper pad 103 or gripper pad 221. Gripper pad 103 or gripper pad 221 may be operatively coupled to a gripping element, e.g., soft gripper 102. Further, gripper pad 103 or gripper pad 221 may include an optical fiber, e.g., fiber optic cable 222, 223, or 224. Fiber optic cable 222, 223, or 224 may be configured to transmit reflected light from the object. The system may further include a spectrometer and a processor (not shown). The spectrometer may be configured to: (i) receive transmitted reflected light from the fiber, e.g., fiber optic cable 222, 223, or 224 and (ii) generate spectral data based on the received transmitted reflected light. The processor may be configured to: (i) receive generated spectral data from the spectrometer and (ii) determine one or more properties of an object based on the received generated spectral data.

A gripping element, e.g., soft gripper 102, may include one or more soft gripping fingers. A probe element may include a reflector and a lens (not shown) at an end of an optical fiber, e.g., fiber optic cable 222, 223, or 224; the lens may be configured to focus light reflected from an object onto the reflector and into the optical fiber, e.g., fiber optic cable 222, 223, or 224. The probe element may further include a gripper pad, e.g., gripper pad 103 or gripper pad 221, that embeds at least a portion of the optical fiber, e.g., fiber optic cable 222, 223, or 224, the lens, and the light source, e.g., bulb 225, 226, or 227.

A gripper pad may be an elastomeric gripper pad, e.g., gripper pad 103 or gripper pad 221. The elastomeric gripper pad, e.g., gripper pad 103 or gripper pad 221, may be attached to a length of one or more soft gripping fingers. A gripping element, e.g., soft gripper 102, may further include a prosthetic hand that in turn includes the one or more soft gripping fingers.

A probe element, e.g., gripper pad 103 or gripper pad 221, may further include one or more auxiliary fibers, e.g., fiber optic cables 222, 223, and/or 224. A system may further include an optical switch (not shown) operatively coupled to (i) a spectrometer and (ii) an optical fiber and the one or more auxiliary fibers, e.g., fiber optic cables 222, 223, and/or 224. The optical switch may be configured to switch among the optical fiber and the one or more auxiliary fibers. A spectrometer, such as that discussed hereinabove, may be further configured to: (i) receive auxiliary light reflected from an object and transmitted via the one or more auxiliary fibers and (ii) generate auxiliary data based on the received auxiliary light. A processor, such as that discussed hereinabove, may be further configured to: (i) receive the generated auxiliary data and (ii) determine one or more properties of the object based on one or more of the received generated spectral data and the received generated auxiliary data. Further, determining one or more properties of an object based on one or more of the received generated spectral data and the received generated auxiliary data may include averaging one or more of the received generated spectral data and the received generated auxiliary data.

A light source, e.g., bulb 225, 226, or 227, may be a full spectrum light source. The full spectrum light source, e.g., bulb 225, 226, or 227, may be a QTH lamp. The transmitted reflected light may include wavelengths in a range of 350-2200 nm.

Figure 3:
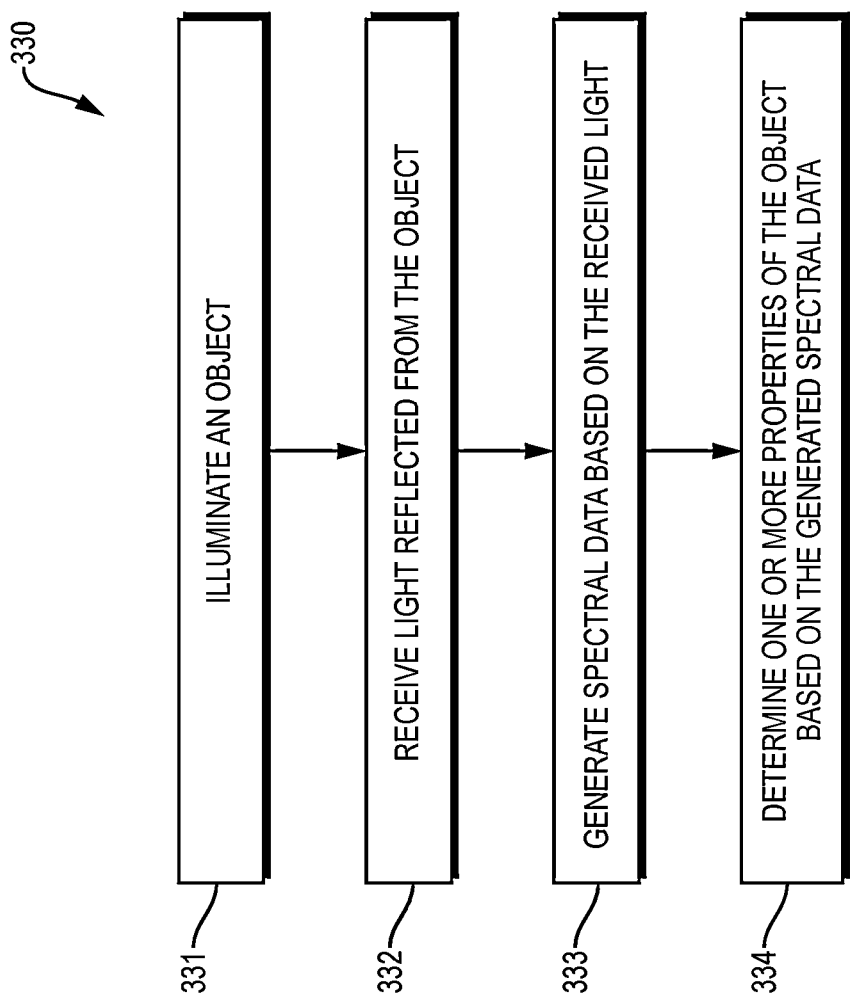
FIG. 3 is a flowchart of a method for determining one or more properties of an object.

FIG. 3 is a flowchart of a method 330 for determining one or more properties of an object. The method 330 starts at step 331 by illuminating an object. Illuminating an object may be accomplished using a light source, e.g., bulbs 225, 226, and/or 227 (FIG. 2). Next, at step 331, the method 330 receives light reflected from the object. Light reflected from an object may be received by a spectrometer described hereinabove, through, e.g., fiber optic cables 222, 223, and/or 224 (FIG. 2). At step 333, the method 330 generates spectral data based on the received light. Generating spectral data may be performed by a spectrometer described hereinabove with respect to FIGS. 1 and 2. Last, at step 334, the method 330 may determine one or more properties of an object based on generated spectral data. Determining one or more properties of an object may be performed by a processor described hereinabove with respect to FIGS. 1 and 2. Further, determining one or more properties of an object may include using a machine learning model. The machine learning model used may be as described in Hanson et al., "Pregrasp Object Material Classification by a Novel Gripper Design with Integrated Spectroscopy," *ar Xiv preprint*, 2022, pp. 1-7, which is herein incorporated by reference in its entirety.

Systems and methods disclosed herein present a design and manufacturing process, including for a reconfigurable soft gripper, for example as pictured in FIGS. 1 and 2, capable of collecting VNIR spectral data from multiple points on grasped objects in real-time, as the gripper closes to its final form. VNIR spectroscopy yields additional information about chemical composition that is not available through tactile sensing alone. Systems and methods disclosed herein are grounded in observations that many organic and inorganic materials reflect distinct quantities of incident light across the spectrum allowing their identification by a spectral signature [8], [9].

A gripper design may be modular with each subsystem comprising a flexible electronic circuit, as well as an illumination source, e.g., bulbs 225, 226, and/or 227 (FIG. 2). A soft robotic gripper, for example soft gripper 102 (FIG. 1), in, e.g., a parallel 3-finger configuration may be used. However, any other gripper or configuration known in the art may be used as well. Furthermore, given a modular framework, different configurations can be utilized as per application requirements. This allows grippers to collect successive spectral samples from multiple points on an object and develop a map of the grasped object's material type and chemical characteristics [10]. This knowledge is useful in not only discriminating between classes, but also in understanding intra-class variation. In particular, systems and methods disclosed herein may measure reflected photon counts in a wavelength range PO 350-1150 nm. This document's contributions include the following:

A design for an exoskeleton-based, pneumatically-actuated soft robotic gripper with a modular sensor tray according to an example embodiment.

Techniques to embed fiber optic cables within elastomeric gel and ensure unimpeded, diffuse full-spectrum light to manipulated objects in an embodiment.

An algorithm to collect multi-point spectral information and demonstrate how it is used to distinguish objects by their spectral signatures according to an example embodiment.

Figure 11A:
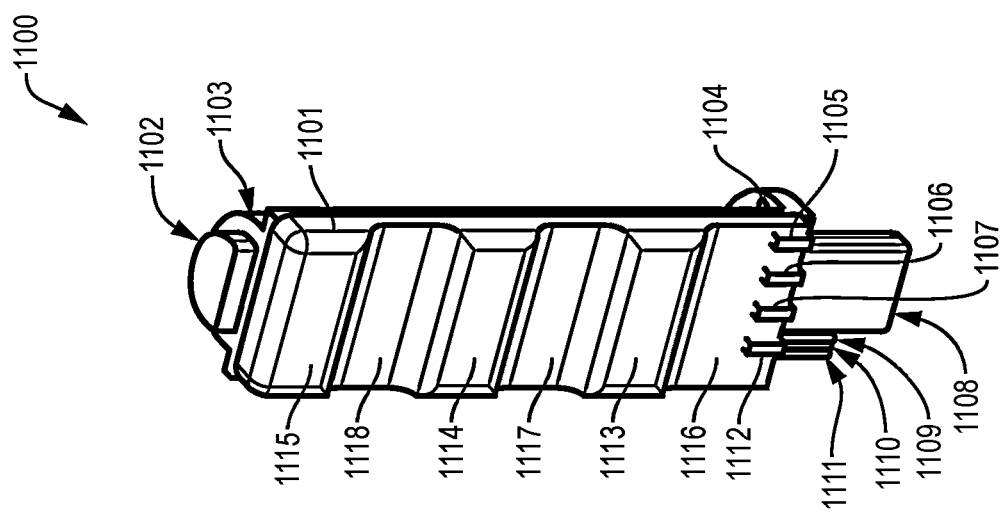
FIG. 11A is a simplified diagram of a soft gripping finger with attached gripper pad showing an angled view of the gripper pad.

FIG. 11A is a simplified diagram of a soft gripping finger 1100 with attached gripper pad 1101 showing an angled view of the gripper pad 1101. Soft gripping finger 1100 may include air bladder end cap 1102, exoskeleton 1103, mounting holes 1104, and air bladder 1108. Gripper pad 1101 may include: electrical pin connections 1105, 1106, and 1107; ground pin connection 1112; fiber optic cable connections 1109, 1110, and 1111; embedded bulbs 1113 (first), 1114

(middle), and 1115 (end); and embedded portions of fiber optic cables 1116 (first), 1117 (middle), and 1118 (end). Exoskeleton 1103 may be 3D printed from, e.g., flexible polylactic acid (PLA). Mounting holes 1104 may be used to attach soft gripping finger 1100 to a base platform. Air bladder 1108 may be made from, e.g., silicone rubber, and may be connected to an air hose assembly. Gripper pad 1101 may be made from, e.g., silicone rubber. Electrical pin connections 1105, 1106, and 1107 may be positive electrical pin connections for embedded bulbs 1113, 1114, and 1115, respectively. Ground pin connection 1112 may be a ground pin connection for all three embedded bulbs 1113, 1114, and 1115. Embedded bulbs 1113, 1114, and 1115 may all be QTH bulbs. Fiber optic cable connections 1109, 1110, and 1111 may interface with a spectrometer.

Figure 11B:
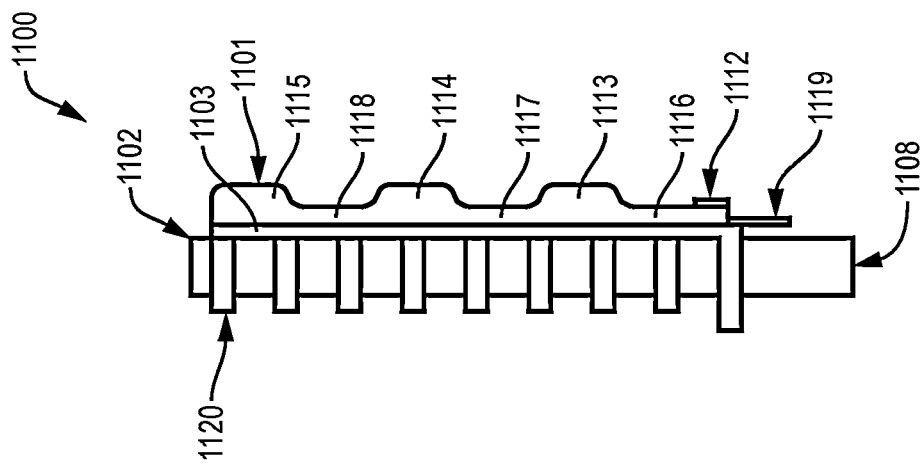
FIG. 11B is a profile view of the soft gripping finger with attached gripper pad of FIG. 11A.

FIG. 11B is a profile view of the soft gripping finger 1100 with attached gripper pad 1101 of FIG. 11A. As shown in FIG. 11B, exoskeleton 1103 may include support ribs 1120. Further, individual fiber optic cable connections 1109, 1110, and 1111 are shown in FIG. 11B as a single bundle of fiber optic cable connections 1119.

Figure 11C:
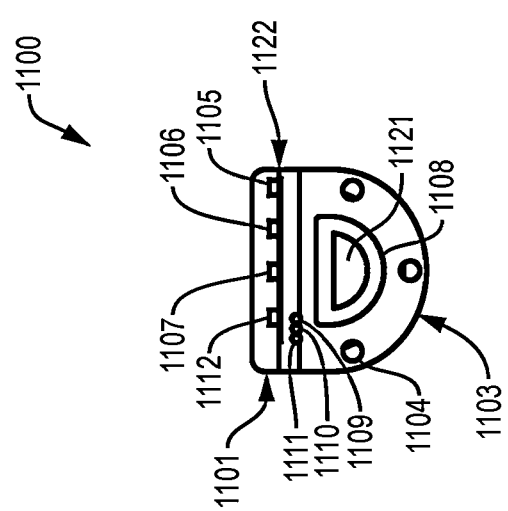
FIG. 11C is an end view of the soft gripping finger with attached gripper pad of FIG. 11A.

FIG. 11C is an end view of the soft gripping finger 1100 with attached gripper pad 1101 of FIG. 11A. As shown in FIG. 11C, gripper pad 1101 may include flexible PCB 1122. Further, air bladder 1108 may include hollow air channel 1121. Hollow air channel 1121 may be used for inflating air bladder 1108, for example via the method described hereinbelow with respect to FIGS. 12A-12C.

Figure 11D:
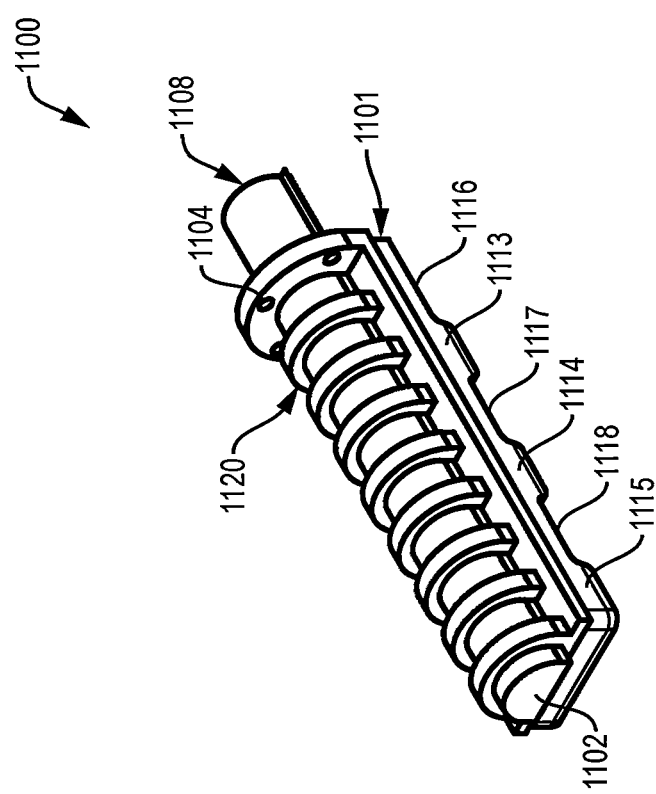
FIG. 11D is a view of the soft gripping finger with attached gripper pad of FIG. 11A emphasizing an exoskeleton of the soft gripping finger.

FIG. 11D is a view of the soft gripping finger 1100 with attached gripper pad 1101 of FIG. 11A emphasizing an exoskeleton 1103 of the soft gripping finger 1100.

Figure 11E:
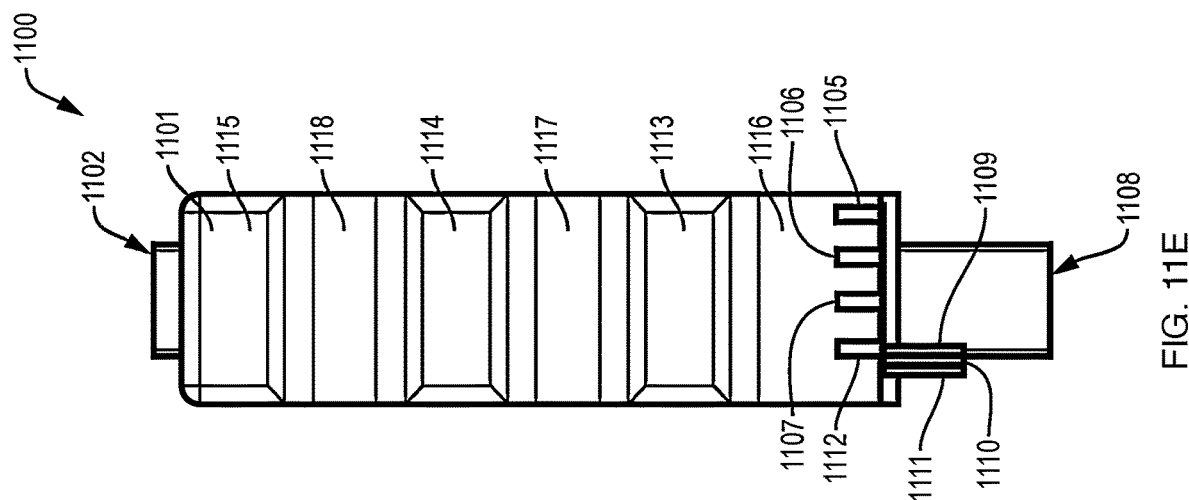
FIG. 11E is a view of the soft gripping finger with attached gripper pad of FIG. 11A emphasizing the gripper pad.

FIG. 11E is a view of the soft gripping finger 1100 with attached gripper pad 1101 of FIG. 11A emphasizing the gripper pad 1101.

Figure 11F:
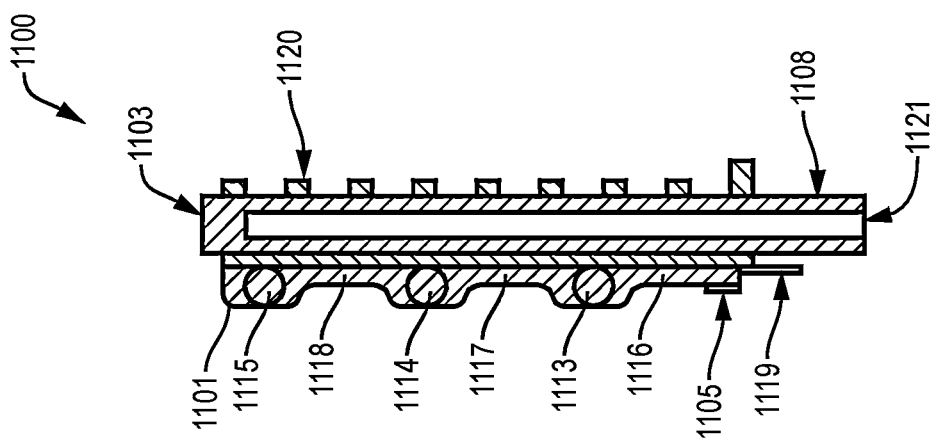
FIG. 11F is a cross-section view of the soft gripping finger with attached gripper pad of FIG. 11A.

FIG. 11F is a cross-section view of the soft gripping finger 1100 with attached gripper pad 1101 of FIG. 11A.

Figure 11G:
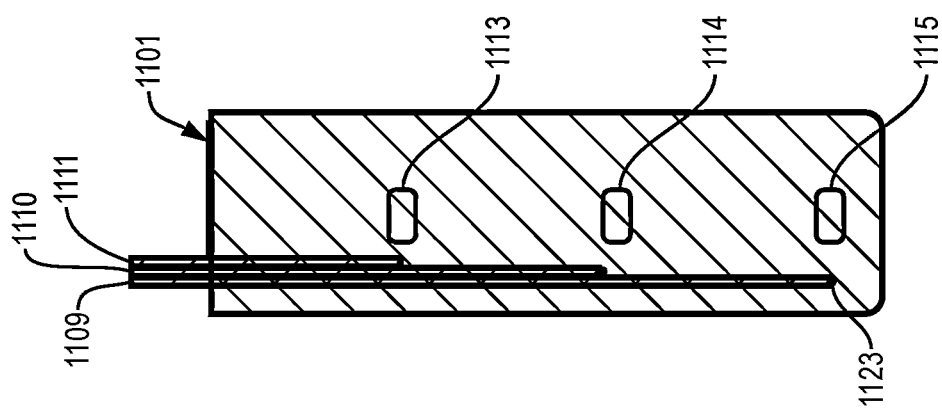
FIG. 11G is a cross-section view of the gripper pad of FIG. 11A.

FIG. 11G is a cross-section view of the gripper pad 1101 of FIG. 11A. As shown in FIG. 11G, a fiber optic cable with connection 1109 may include a ball lens 1123 at an end of the cable embedded in gripper pad 1101. Ball lens 1123 may be associated with an embedded portion of a fiber optic cable 1118, which is located at an end position of gripper pad 1101. Further, ball lens 1123 may serve to redirect light emitted by, e.g., corresponding embedded bulb 1115 at an end position of gripper pad 1101, and reflected from surfaces of objects grasped by soft gripping finger 1100.

Soft gripping finger 1100 with attached gripper pad 1101 can implement the method 330, described hereinabove in relation to FIG. 3, to determine one or more properties of an object.

To provide such functionality, a system may include a gripping element, e.g., soft gripping finger 1100. Soft gripping finger 1100 may be configured to grasp an object. The system may further include a light source, e.g., bulb 1113, 1114, or 1115. Bulb 1113, 1114, or 1115 may be configured to illuminate the object. The system may further include a probe element, e.g., gripper pad 1101. Gripper pad 1101 may be operatively coupled to a gripping element, e.g., soft gripping finger 1100. Further, gripper pad 1101 may include an optical fiber, e.g., a fiber optic cable with connection 1109, 1110, or 1111. Fiber optic cable optic cable with connection 1109, 1110, or 1111 may be configured to transmit reflected light from the object. The system may further include a spectrometer and a processor (not shown). The spectrometer may be configured to: (i) receive transmitted reflected light from the fiber, e.g., fiber optic cable with connection 1109, 1110, or 1111 and (ii) generate spectral data based on the received transmitted reflected light. The processor may be configured to: (i) receive generated spectral data from the spectrometer and (ii) determine one or more properties of an object based on the received generated spectral data.

The gripping element may include one or more soft gripping fingers, e.g., soft gripping finger 1100. Further, the probe element may include a reflector (not shown) and a lens, e.g., ball lens 1123, at an end of the optical fiber, e.g., fiber optic cable with connection 1109. The lens, e.g., ball lens 1123, may be configured to focus light reflected from the object onto the reflector and into the optical fiber, e.g., fiber optic cable with connection 1109. The probe element may further include a gripper pad e.g., gripper pad 1101, that embeds at least a portion of the optical fiber, e.g., fiber optic cable with connection 1109, the lens, e.g., ball lens 1123, and the light source, e.g., bulb 1113, 1114, or 1115. The gripper pad may be an elastomeric gripper pad, e.g., gripper pad 1101. Further, the elastomeric gripper pad, e.g., gripper pad 1101, may be attached to a length of the one or more soft gripping fingers, e.g., soft gripping finger 1100.

Figure 8:
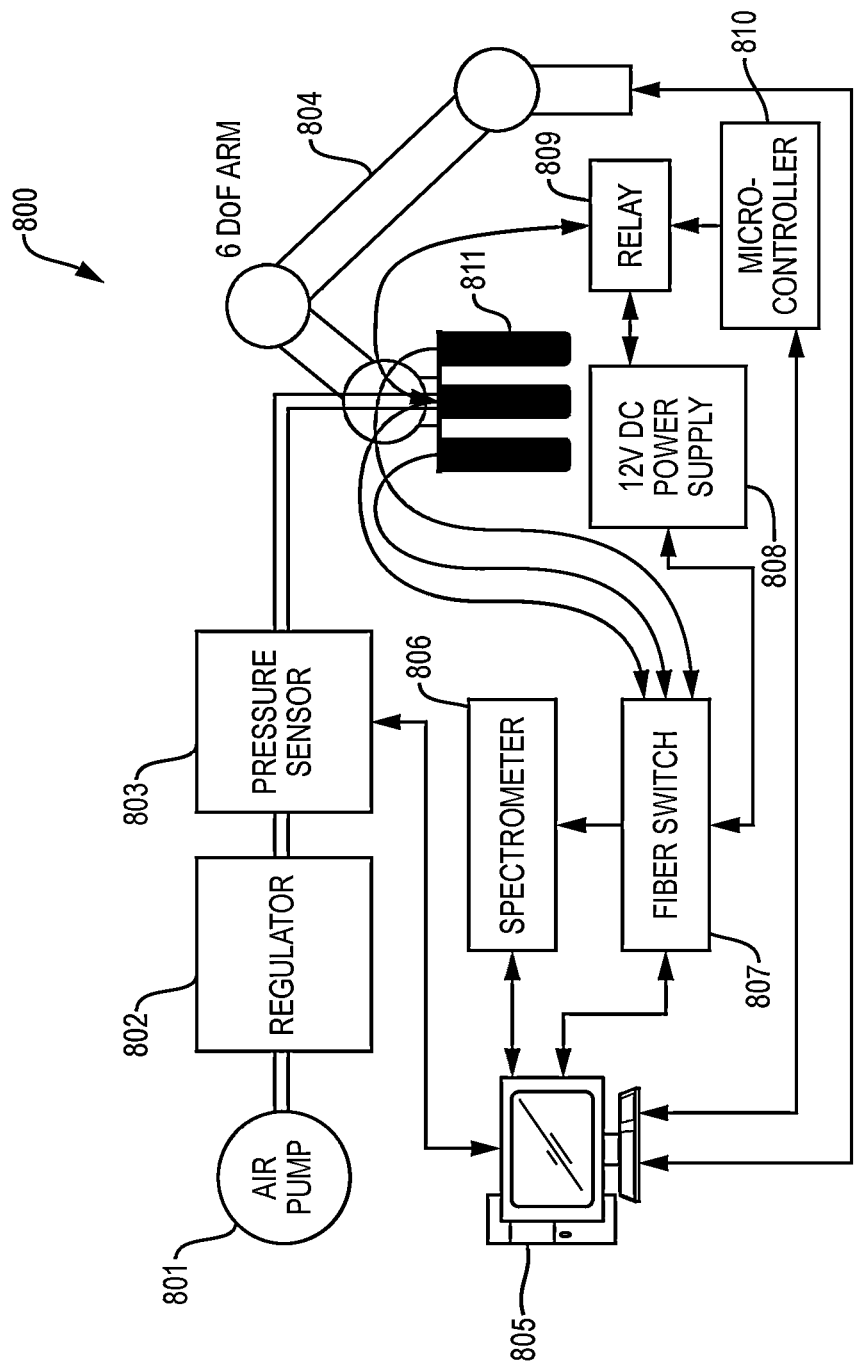
FIG. 8 is a simplified block diagram of a system architecture for actuation of a soft gripper and acquisition of spectral readings.

FIGS. 12A-12C are simplified diagram views showing different angles of actuation for a soft gripping finger with attached gripper pad. The soft gripping finger may include air bladder 1201. Air bladder 1201 may be connected to a pressurized air line through a regulator, e.g., regulator 802 as shown in FIG. 8 described hereinabove. Increasing maximal pressure increases an angle of finger actuation. This is shown in FIGS. 12A-12C. As pressure increases, so does angle of actuation from FIG. 12A to FIG. 12B. Further increasing pressure leads to a further increase in angle of actuation, as seen in the contrast between FIG. 12B and FIG. 12C. A method for pneumatically actuating a soft gripping finger may be as described in M. B. Oliveira et al., "Hybrid fabrication of a soft bending actuator with casting and additive manufacturing," in *International Design Engineering Technical Conferences and Computers and Information in Engineering Conference*, vol. 59230. American Society of Mechanical Engineers, 2019, p. V05AT07A015, which is herein incorporated by reference in its entirety.

Figure 13C:
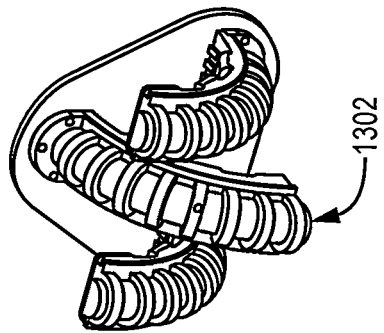
FIGS. 13A-13C are simplified diagram views showing different degrees of actuation for three soft gripping fingers with attached gripper pads included in a gripping element.
Figure 13B:
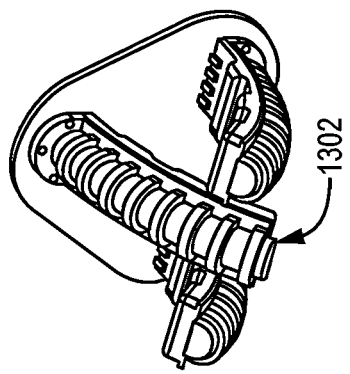
Figure 13A:
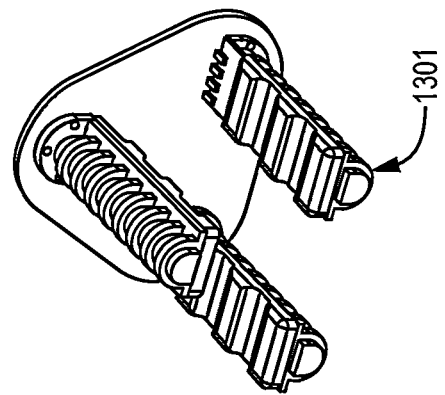

FIGS. 13A-13C are simplified diagram views showing different degrees of actuation for three soft gripping fingers with attached gripper pads included in a gripping element. As with FIGS. 12A-12C, angle of actuation for a soft gripping finger 1301 or 1302 increases with successive increases in pressure, as shown by FIGS. 13A-13C.

Figure 14:
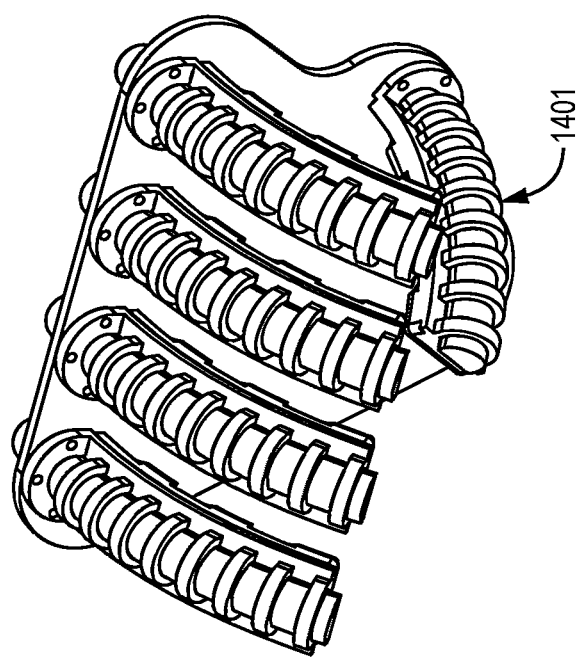
FIG. 14 is a simplified diagram of a gripping element including a prosthetic hand with five soft gripping fingers with attached gripper pads.

FIG. 14 is a simplified diagram of a gripping element including a prosthetic hand 1401 with five soft gripping fingers with attached gripper pads.

II. Related Work

A. Grasped Material Identification

Previous approaches to grasped material identification fall under two general categorizations: contact-based and contact-free. Contact-free methods commonly employ computer vision to label individual pixels or patches of images, although such methods are subject to illumination noise and are limited by the material resolution available [11], [12], [13]. Elastomeric sensors are the current state-of-the-art system in contact-based material estimation. They measure surface topography and contact forces through deformation of a contact gel imaged by a small, high-resolution camera [4], [5], [6]. The imaged gel deformation is an input to a Convolutional Neural Network (CNN), allowing deep learning models to learn grasping strategies for many objects. [6]. Elastomeric tactile sensing has been restricted to rigid robotic manipulators, as their designs require fixed spatial placement of illuminating Light Emitting Diodes (LEDs) relative to the surface gel; such an assumption is difficult to maintain for flexible grippers. Increasing the size and deformation capabilities of the sensing area through an air-regulated bladder has been shown to be a reasonable compromise between wholly flexible and rigid grippers [7].

Work with compliant grippers has focused on identifying objects by their shape and force as observed by the manipulator when lifting them. Zhao et al. developed a technique to manufacture optical waveguides—a lossy light conduit capable of measuring deformation by comparing light transmitted to a terminal sensor with the unimpeded transmission to a photodetector [14], [15]. Bai et al. created a fabrication process to make these waveguides from stretchable gels and tri-color dye doped regions sporting spatial resolution of 1 centimeter (cm) [16]. Although these waveguides provide coarse estimates of the object shape and size, they fail to understand the underlying material of the grasped object, as finer textures and composition cannot be differentiated.

B. Spectroscopy

Field spectroscopy is a developing discipline, particularly within the area of robotics. Previously, [21] utilized commercial spectrometers to differentiate between generalized material classes, such as metal, plastic, wood, paper, and fabric with the introduction of a neural network architecture and improved their findings with visual-spectral fusion [22]. The same group later used this mounted spectrometer to quantify object penetrability for autonomous tool construction [23].

In the agriculture domain, [24] designed and constructed a gripper with two spectral probes and accelerometers to simultaneously measure the spectral profile and hardness of a mango as inputs to a ripening index. However, since the gripper could only grip round items of a certain size, it does not generalize to multiple grasping scenarios.

In prior work [25], a parallel plate gripper with an integrated spectral probe and endoscope camera was developed. Combining online data processing and a nonlinear Support Vector Machine (SVM) machine learning model, the gripper demonstrated the capability to distinguish between visually similar real (organic) and fake (plastic/polystyrene) fruits with an accuracy of 96.41% in a 32-class decision problem.

III. Materials

Systems and methods disclosed herein may use any variety of soft, flexible, or rigid grippers, spectrometers, base materials, and light sources to collect data of real-world objects subject to the material sensing functionality described herein.

A. Soft Gripper Selection

Systems and methods disclosed herein may employ a hybrid manufactured soft robotic finger using casting and three-dimensional (3D) printing [26] as the base for a sensing platform. A method used for hybrid fabrication including 3D printing and casting may be as described in M. B. Oliveira et al., "Hybrid fabrication of a soft bending actuator with casting and additive manufacturing," in *International Design Engineering Technical Conferences and Computers and Information in Engineering Conference*, vol. 59230. American Society of Mechanical Engineers, 2019, p. V05AT07A015, which is herein incorporated by reference in its entirety. The aforementioned gripper design may represent a robust platform to add a sensing array. Furthermore, a 3D printed exoskeleton may add lateral and torsion stability in all but a target direction of motion. This torsion resistance is important for integrity of embedded electronics, which can break electrical contacts when twisted. An exoskeleton gripper may provide the following exemplary core benefits:

Faster fabrication time, as a bladder, exoskeleton, and sensor tray can be fabricated in parallel.

Materials of a bladder and exoskeleton may be varied for a tailor-made actuator with desired characteristics.

3D printing may allow for rapid modification and iteration of exoskeleton designs as required.

A gripper design process according to systems and methods disclosed herein may be driven by a set of design specifications, including: (1) handling objects of size 0-8.5 centimeters (cm) in diameter; (2) collecting continuous spectral data at a rate of 10 hertz (Hz) in a wavelength range of 400-1100 nm; (3) collecting three readings per finger using an in-situ illumination source; and (4) lifting objects ≥2.0 kilograms (kg).

B. Spectrometer Specifications

To collect spectral readings, systems and methods disclosed herein may utilize a spectrometer. One example of such a device is a BLUE-Wave miniature spectrometer (StellarNet, Inc.). The device's small form factor (13.42 cm×8.81 cm×3.12 cm) and signal-to-noise ratio of 1000:1 may add to its reliability as a platform for integration with a co-robot manipulator. The system is consistently utilized by chemists and biologists, and provides data transmission and configuration over USB [27], [28]. In general, a spectrometer may be calibrated by the manufacturer, and its internal detector may be sensitive to a range of 350-1150 nm. Light may be introduced to a spectrometer via a single input slit (width 100 micrometers (μm)) and diffracted across a grating to a detector, which may for example be silicon-based. The detector may count incident photons in a localized wavelength range. A spectrometer may be designed to be replaceable by other spectrometers, providing additional wavelength range or sensitivity as dictated by an application. However, systems and methods disclosed herein are not limited to particular spectrometer and detector types listed above; instead, any suitable spectrometer and detector known in the art may be used.

C. Elastomeric Gel Selection

Three key characteristics may be considered for a sensor grip pad: (1) flexibility, (2) hardness, and (3) optical clarity. As an example, four commonly used silicone elastomers may be evaluated: Solaris (Smooth-On Inc.) [17], Dragon Skin 30 (Smooth-On Inc.) [18], Ecoflex 30 (Smooth-On Inc.) [19], and Sylgard 186 (Dow Chemical Company) [20]. Optical clarity may be prioritized because fibers need minimally obstructed light to ensure adequate characterization of grasped materials. A StellarNet spectrometer may be used to measure reflected light from a QTH bulb reflected against a white reference standard (e.g., Spectralon) through an 8 (millimeter) mm thick piece of each gel at a distance of 20 cm to avoid saturation. The intensity of reflected light may be observed at three different example voltages: 5 volts (V), 7 V, and 9 V. Results, as fully described and illustrated in U.S. Provisional Application No. 63/267,677, filed on Feb. 8, 2022, may indicate that, e.g., Sylgard 186 and Solaris produce greater responses than raw light in some collections because the material acts as a lens and provides a slight focusing effect increasing the number of detected photons. Increasing voltage beyond 10 V may be avoided, as increased voltage may correspond with increased illuminance and sensor saturation.

Material properties for different gel types may include Shore A hardness, tensile strength (pounds per square inch (PSI)), tear strength (kilonewtons per meter (kN/m)), which may be determined according to ASTM D624 die type B standard, elongation at break (%), temperature (temp.) range (degrees Celsius (° C.)), and clarity, as shown in Table 1 below; bold font indicates an exemplary best attribute.

TABLE 1

Quantitative Comparison of Properties for Different Silicon-based Elastomeric Gels

| Gel Type | Shore A Hardness | Tensile (PSI) | Tear-die B (kN/m) | Elongation at Break (%) | Temp. Range (° C.) | Clarity |
|---|---|---|---|---|---|---|
| Solaris [17] | 15 | 180 | Not Available | 290 | −100-205 | Clear |
| Dragon Skin 30 [18] | 30 | 500 | 18.9 | 364 | −53-232 | Translucent |
| Ecoflex 30 [19] | 30 | 200 | 6.66 | 900 | −53-232 | Translucent |
| Sylgard 186 [20] | 24 | 305 | 7.0 | 255 | −45-200 | Clear |

Based on the material properties detailed in Table 1 above, and the results described in U.S. Provisional Application No. 63/267,677, Sylgard 186 may, for example, be selected as a base material for an optics sensor tray. Sylgard 186 offers adequate compressive and tensile strength while coming in as a close second to Solaris in terms of optical clarity. It is noted that while Solaris exhibits nearly unimpeded light transmission at all voltages across a spectrum, it manifests a brittleness in demolding and a tendency to allow small surface imperfections or abrasions to propagate through a width of a cast volume when bent. This observation reinforces the manufacturer's recommendation that Solaris is chiefly designed for static encapsulation and not regular bending. However, systems and methods disclosed herein are not limited to specific gel types listed above; rather, any suitable base material known in the art may be used.

D. Full Spectrum Illumination

For VNIR spectroscopy to accurately measure reflected light, incident light must be representative of wavelengths being measured. Normal LEDs may provide only a limited spectral illumination source (≈20 nm Full Width Half Maximum (FWHM)) [29] and an array covering a necessary spectrum with LEDs may prove unnecessarily complex. Previous research [25] used a fiber optic bundle to deliver light from a QTH bulb in close proximity to a signal fiber. However, such a bundle may require additional protective layers to preserve a fiber arrangement, reducing its flexibility. QTH bulbs (e.g., Thorlabs) may be embedded directly into elastomeric finger grip pads. This strategy may jointly enable illuminating grasped objects in a wide range of ambient lighting conditions and may deliver localized diffuse light for individual fiber acquisition. Systems and methods disclosed herein are not limited to a specific bulb type listed above; rather, any suitable bulb known in the art may be used.

Figure 4:
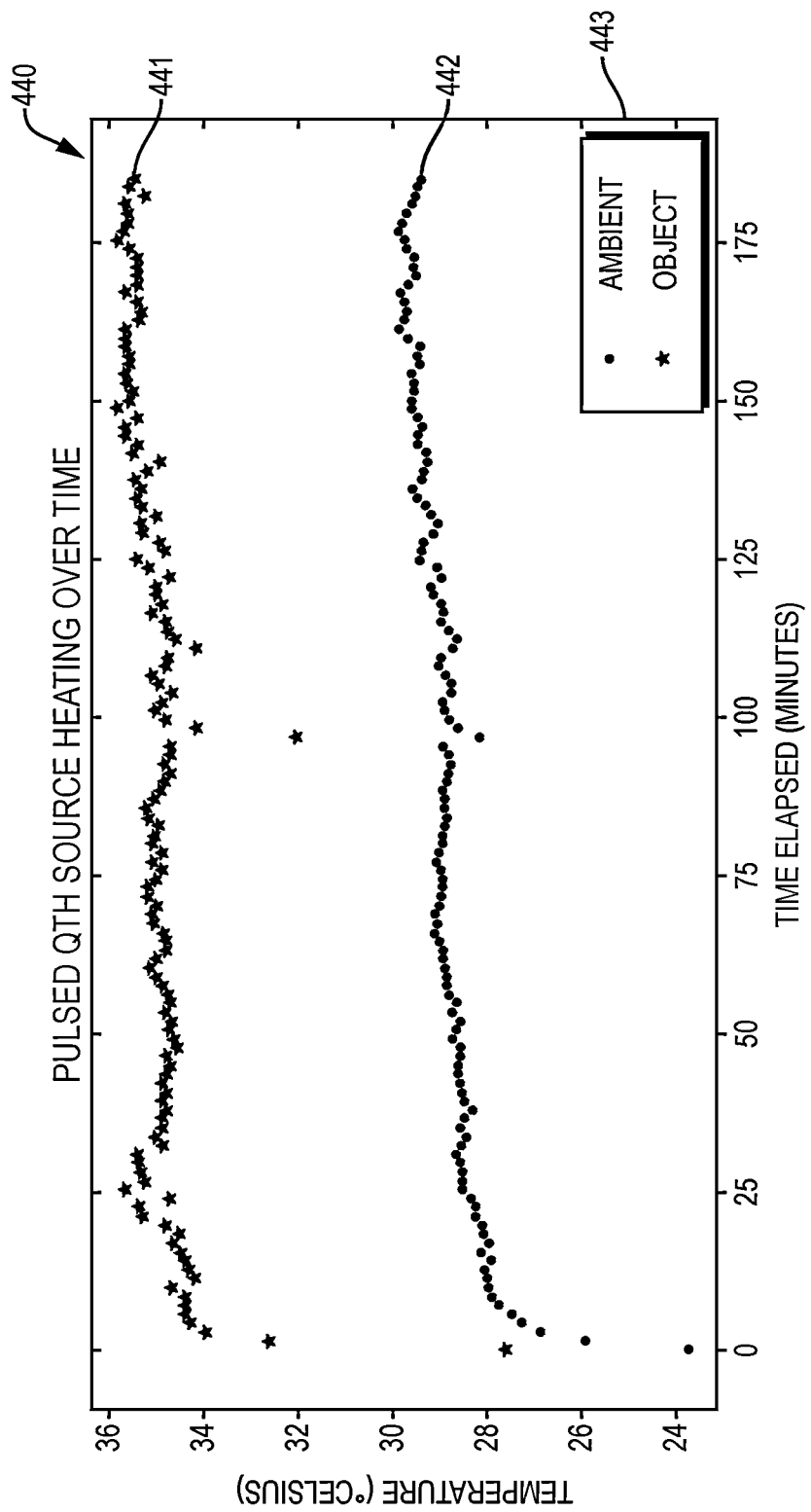
FIG. 4 is a graph of QTH source heat accumulation in surface and environment ambient temperatures over time as measured by an infrared thermometer.

QTH bulbs suffer from a known challenge of high operating temperatures [30]. To minimize heat accumulation caused by continuous operation, bulbs may be pulsed in a sequential fashion whenever a grasping procedure is initialized. Bulb temperature rise may also be tested by applying a sequence of voltages—12 V (a maximum voltage recommended by a manufacturer) for 5 seconds and 0 V for 5 seconds—to each bulb repeatedly over 3 hours while measuring ambient and surface temperature of the bulb with an infrared thermometer (e.g., Adafruit). FIG. 4 is a graph of QTH source heat accumulation in surface 441 and environment ambient 442 temperatures over time as measured by an infrared thermometer. Temperature (° C.) over elapsed time (minutes) is shown in FIG. 4 by plot 440 in accordance with legend 443; as indicated by legend 443, points on the curve for surface temperature 441 are shown by star icons, while points on the curve for ambient temperature 442 are shown by dot icons. As illustrated by FIG. 4, bulb temperature may plateau at 35° C.—within range of, e.g., Sylgard 186's safe working temperature. This may also establish an upper threshold for bulb heat. A single anomalous sensor reading near 100 elapsed minutes may not be consequential to thermal stability. A finite element simulation may be performed to demonstrate additional thermal dissipation properties presented by placing bulbs in gel as well as concentration points of surface heat. Simulation results, as fully described and illustrated in U.S. Provisional Application No. 63/267,677, filed on Feb. 8, 2022, may indicate a highest concentration of heat is opposite a main object contact surface.

IV. Fabrication

A. Fiber Optic Cables

Spectrometers contain complex electrical components which are not easily miniaturized, nor made flexible because they rely on a predefined geometry to split light into component wavelengths. Fiber optic probes are used to make spectroscopy more dynamic by leveraging a glass fiber's total internal reflectance to route light into a spectrometer inlet slit, thus separating a photodetector from a point of interest. Fiber optics' inherent flexibility, up to a bend radius defined by thickness and cable cladding, makes them ideal candidates for inclusion in a flexible gripper.

Figure 5:
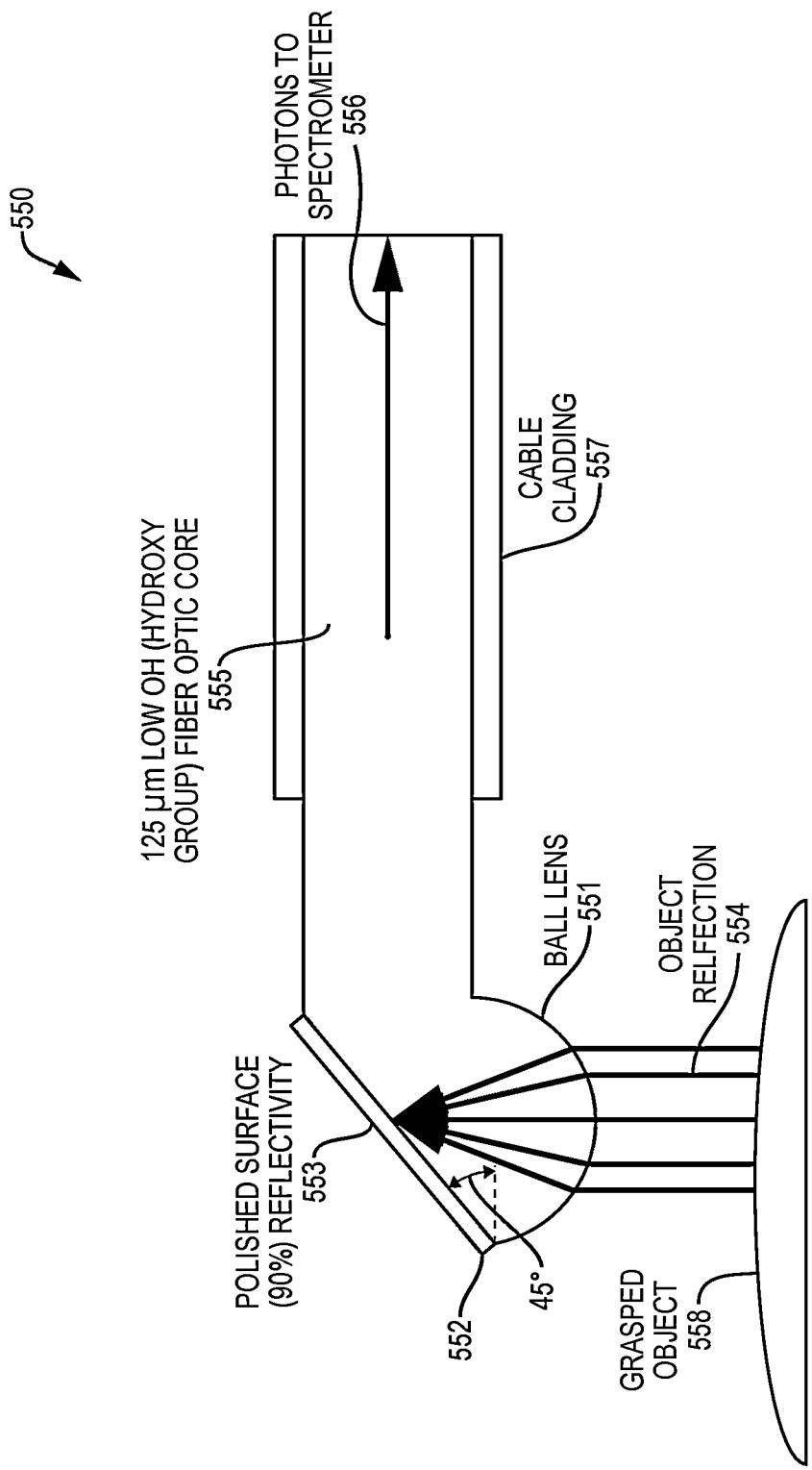
FIG. 5 is a simplified cross-section diagram of a lensed fiber optic cable.

Although excellent conduits for a near-infrared (NIR) spectrum, fiber optic strands may have a limited numerical aperture (NA), which defines a sine of a largest angle that light offset from a fiber core will enter a length. To overcome this challenge, specialized lensed fibers (e.g., LaseOptics Corp.) may be utilized; such lensed fibers may be capable of transmitting light from 350-2200 nm. FIG. 5 is a simplified cross-section diagram of a lensed fiber optic cable 550. Lensed fiber optic cable 550 may include ball lens 551, cleave 552, polished surface 553, core 555, and cladding 557. Lensed fiber optic cable 550 may be nearly identical in form and function to a standard optics-grade fiber, but may contain ball lens 551 and 45° cleave 552 with polished surface 553 of, e.g., metal, to change an end aperture of the cable 550 to be perpendicular to a fiber length. In effect, this may allow fiber to be run through a length of a finger while still collecting measurements from grasped objects. Reflected light 554 from an object 558 may enter ball lens 551 and be routed by cleave 552 and polished surface 553 along core 555 as photons to spectrometer 556. Systems and methods disclosed herein are not limited to a lensed fiber type listed above; rather, any suitable lensed fiber known in the art may be used. Lensed fiber optic cable 550 can implement the method 330, described hereinabove in relation to FIG. 3, to determine one or more properties of an object.

To provide such functionality, a system may include a gripping element (not shown), which may be configured to grasp an object. The system may further include a light source (not shown), which may be configured to illuminate the object. The system may further include a probe element (not shown), which may be operatively coupled to the gripping element. Further, the probe element may include an optical fiber, e.g., fiber optic cable 550. Fiber optic cable 550 may be configured to transmit reflected light from the object. The system may further include a spectrometer and a processor (not shown). The spectrometer may be configured to: (i) receive transmitted reflected light from the optical fiber, e.g., fiber optic cable 550, and (ii) generate spectral data based on the received transmitted reflected light. The processor may be configured to: (i) receive generated spectral data from a spectrometer and (ii) determine one or more properties of an object based on the received generated spectral data. The probe element may include a reflector, e.g., polished surface 553, and a lens, e.g., ball lens 551, at an end of the optical fiber, e.g., fiber optic cable 550, the lens, e.g., ball lens 551, being configured to focus light reflected from the object, e.g., reflected light 554, onto the reflector, e.g., polished surface 553, and into the optical fiber, e.g., fiber optic cable 550.

B. Flexible Circuitry

Figure 6:
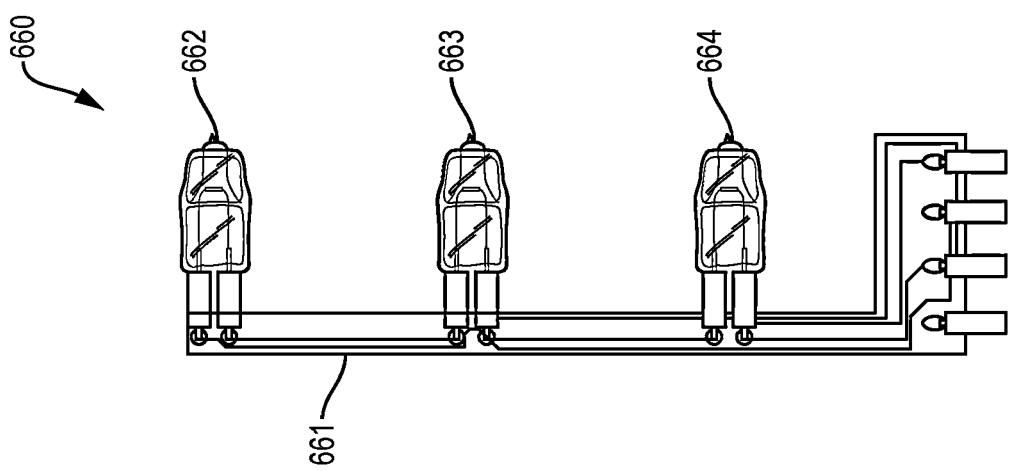
FIG. 6 is an image of a printed circuit board (PCB).

Power circuitry for QTH lamps may be a PCB fabricated on flexible, copper-clad FR4, or any other suitable base material known in the art, which may be embedded in a gripper pad. A circuit board may be designed in a known system, such as EAGLE; prototypes may be laser etched on, for example, a UV laser (e.g., LPKF Protolaser U4), or any other suitable laser known in the art; and components may be soldered by hand. Because Sylgard 186 has a volume resistivity of $4.98 \times 10^{15}$ Ωcm, it may effectively protect a circuit board, meaning no additional soldermask or conformal coating may be necessary to prevent shorts. FIG. 6 is an image 660 of an example PCB 661 connected to lamps 662, 663, and 664. In addition to conveying electrical power to lamps 662, 663, and 664, circuit board 661 may also act as a scaffold, holding lamps 662, 663, and 664 in correct position during a casting process. Circuit board 661 may be oriented with its most bendable axis parallel to a primary bending direction of a gripper, and PCB 661's surface area may be minimized to limit an amount of bending stiffness.

C. Gripper Pad Configuration

A gripper pad may consist of alternating thick and thin segments of constant width. In addition to adding surface texture and tack, thicker sections may be large enough to encapsulate QTH lamps while thin portions may add only enough stiffness to protect innervated fibers. For example, Sylgard 186 may be cast in 3D printed molds, made of a known 3D printing material such as Onyx™ (nylon-carbon fiber matrix) on, e.g., a Markforged X7, or other suitable system known in the art. Sylgard 186 is highly viscous (66700 cP) while in its pot state, which makes vacuum degassing very difficult. Degassing may be supplemented withed curing in a heated, pressurized chamber (e.g., 65.6° C. at ≈80 PSI) to compress inset gas bubbles for a duration of a cure. This may result in optical clarity similar to that of degassed Solaris. Thermal stability of Onyx™ or other known material may prevent deformation in a molding chamber.

Because of fragility of encased elements, as well as, e.g., Sylgard 186's low tear strength, unstructured demolding (such as bending and pulling) may cause significant damage to gripper pads. Rather than using a mold release agent, which may mar a surface finish (and therefore optical quality) of a pad, a mold with integrated ejectors may be employed. These may not only serve as mold geometry but may also minimize shearing forces in demolding. A mold may be further smoothed with, e.g., sulfur-free modeling clay, or other suitable material known in the art, to minimize surface texture left by a 3D printing process.

Systems and methods disclosed herein are not limited to a specific gel, printing material, or printer type listed above; rather, any suitable gel, printing material, or printer known in the art may be used.

D. Fiber Innervation

To ensure coverage of grasped items, fiber optic receptors may be placed at a center of each thin section of a grip pad. This spacing may ensure that QTH lamps do not saturate a signal and may cause a natural air gap between a lensed end of a fiber and an item of interest, thus allowing light to be reflected into a lens. Because a lensed end may be perpendicular to an axis of a fiber, orientation of a fiber during casting may be particularly important, as even minor angular deviations can affect a quantity of light focused into a limited NA of a fiber. Fibers may have, e.g., a 125 μm bare fiber diameter, meaning that a contact area for clamping may be small relative to an overall width of a gripper pad. A possibility for torsion may be accounted for both in a clamped region of a fiber, and in a region between a clamped point and a lens. To improve distributed contact in the fiber clamping, swatches of, e.g., Ecoflex 30 may be placed along jaws of a clamp, which may protect fibers from point compression while increasing friction. Moreover, fibers may be innervated in two separate stages:

a) Cast "wings" may be fused to a tip of each fiber. By using a small mold, it is possible to clamp a fiber closer to a lensed end, limiting possible torsion. A light source may be attached to a fiber to help with seeing a lensed end's orientation and aligning a beam in a mold. Wings may then be poured and cured.

b) Winged fibers may be placed in their positions, centered between gripper pads containing QTH bulbs, followed by pouring, e.g., Sylgard 186 a second time with all encapsulated components. Because wings may be larger and resistant to twisting, a single clamp may hold fibers in place without concern about rotational alignment of fibers during a second cure.

Figure 7:
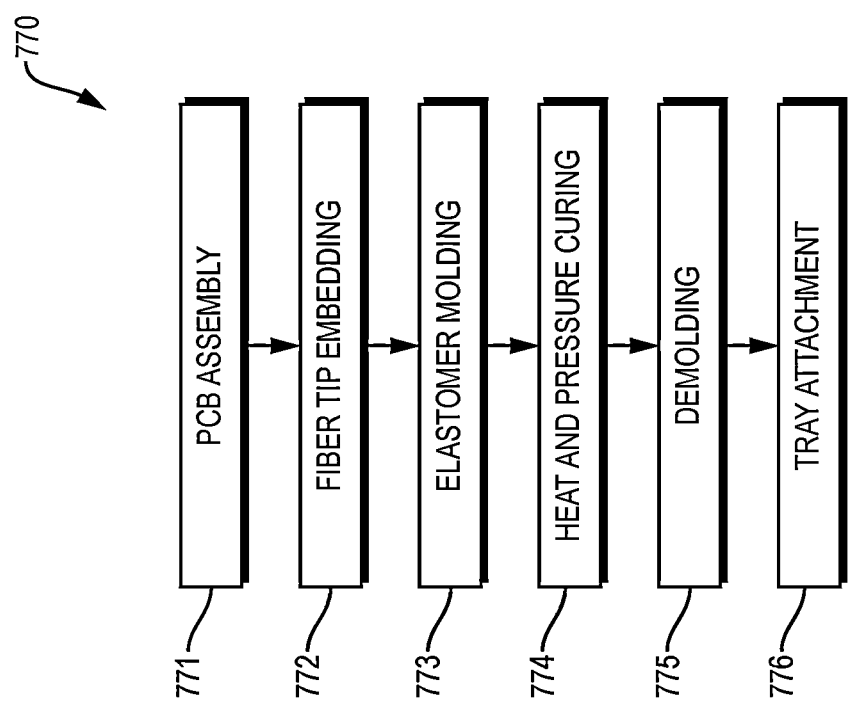
FIG. 7 is a flowchart of a method for fabricating a fiber optic sensor tray and attachment to a soft gripper finger.

FIG. 7 is a flowchart of a method 770 for fabricating a fiber optic sensor tray and attachment to a soft gripper finger. First, at step 771, a PCB may be assembled. At step 772, fiber tips may be embedded. Next, at step 773, elastomer molding may take place. At step 774, heat and pressure curing may occur. Demolding may then be performed at step 775. Finally, at step 776, a tray may be attached. Further details of a fabrication process that may be used in method 770 are fully described and illustrated in U.S. Provisional Application No. 63/267,677, filed on Feb. 8, 2022.

Systems and methods disclosed herein are not limited to specific gel types listed above; rather, any suitable gels known in the art may be used.

E. Assembly

Completed gripper pads (with electronics and fibers) may be attached to a flexible gripper's 3D printed skeleton with elastic bands. A skeleton may then be mounted to an adapter plate, which may connect to a robot (e.g., Universal Robotics UR3e) and route electrical, optical, and fluid connections.

Electronics: PCBs may terminate in wired connections that lead to a relay board connected to a power source. This may allow any combination of lamps to be illuminated programmatically via a microcontroller (e.g., Arduino Uno).

Optics: Optical fibers may terminate with, e.g., SMA-905, or other known connections to a switch (e.g., Agiltron). This device may use a series of micro-electro-mechanical systems (MEMS) reflectors to switch fiber connected to a spectrometer. Both a switch and a spectrometer may be operated electronically via serial connection or any other suitable connection known in the art.

Pneumatics: A flexible gripper's inflatable bladders may be connected to a pressurized air line through a regulator (e.g., Parker-Watts R374-02 GB). Increasing maximal pressure may increase an angle of finger actuation. This can be done either programmatically or manually according to techniques known in the art.

Systems and methods disclosed herein are not limited to a specific robot, microcontroller, switch, or regulator type listed above; rather, any suitable robot, microcontroller, switch, and/or regulator known in the art may be used.

V. Data Acquisition

FIG. 8 is a simplified block diagram of a system architecture 800 for actuation of a soft gripper and acquisition of spectral readings. As shown in FIG. 8, system architecture 800 may include air pump 801, regulator 802, pressure sensor 803, six DoF arm 804, processor 805, spectrometer 806, fiber switch 807, power supply 808, relay 809, microcontroller 810, and soft gripper 811. FIG. 8 outlines physical and electrical linkages necessary to actuate and acquire data from a gripping system. Component connections for system architecture 800 may include: electrical power (among, e.g., switch 807, power supply 808, relay 809, and/or gripper 811), pneumatic (among, e.g., pump 801, regulator 802, sensor 803, and/or gripper 811), fiber optic (among, e.g., spectrometer 806, switch 807, and gripper 811), and data (among, e.g., sensor 803, arm 804, processor 805, spectrometer 806, switch 807, relay 809, and microcontroller 810). System architecture 800 can implement the method 330, described hereinabove in relation to FIG. 3, to determine one or more properties of an object.

To provide such functionality, system architecture 800 may include a gripping element, e.g., soft gripper 811. Soft gripper 811 may be configured to grasp an object. System architecture 800 may further include a light source (not shown), which may be configured to illuminate an object. System architecture 800 may further include a probe element (not shown), which may be operatively coupled to a gripping element, e.g., soft gripper 811. Further, the probe element may include an optical fiber (not shown), which may be configured to transmit reflected light from an object. System architecture 800 may further include a spectrometer, e.g., spectrometer 806, and a processor, e.g., processor 805 and/or microcontroller 810. The spectrometer, e.g., spectrometer 806, may be configured to: (i) receive transmitted reflected light from an optical fiber and (ii) generate spectral data based on the received transmitted reflected light. The processor, e.g., processor 805 and/or microcontroller 810, may be configured to: (i) receive generated spectral data from a spectrometer, e.g., spectrometer 806, and (ii) determine one or more properties of an object based on the received generated spectral data.

A gripping element, e.g., soft gripper 811, may include one or more soft gripping fingers. A probe element may include a reflector and a lens at an end of an optical fiber (not shown); a lens may be configured to focus light reflected from an object onto the reflector and into an optical fiber. A probe element may further include a gripper pad, e.g., gripper pad 103 or gripper pad 221, that embeds at least a portion of an optical fiber, e.g., fiber optic cable 222, 223, or 224, a lens, and a light source, e.g., bulb 225, 226, or 227.

A gripper pad may be an elastomeric gripper pad (not shown), which may be attached to a length of one or more soft gripping fingers. A gripping element, e.g., soft gripper 811, may further include a prosthetic hand that in turn includes one or more soft gripping fingers.

A probe element may further include one or more auxiliary fibers (not shown). System architecture 800 may further include an optical switch, e.g., fiber switch 807, operatively coupled to (i) a spectrometer, e.g., spectrometer 806, and (ii) an optical fiber and one or more auxiliary fibers (not shown). An optical switch, e.g., fiber switch 807, may be configured to switch among an optical fiber and one or more auxiliary fibers. A spectrometer, e.g., spectrometer 806, may be further configured to: (i) receive auxiliary light reflected from an object and transmitted via one or more auxiliary fibers and (ii) generate auxiliary data based on the received auxiliary light. A processor, e.g., processor 805 and/or microcontroller 810, may be further configured to: (i) receive generated auxiliary data and (ii) determine one or more properties of an object based on one or more of received generated spectral data and the received generated auxiliary data. Further, determining one or more properties of an object based on one or more of received generated spectral data and received generated auxiliary data may include averaging one or more of the received generated spectral data and the received generated auxiliary data.

Spectral data may require initial calibrations to remove system noise from readings. Two readings may be taken: dark count d, defining system noise when no ambient light is present, and w, defining total reflectance of a white reference standard. This step may be performed once per device, because local lighting conditions may be controlled within a grasp of a gripper, with reflected, e.g., QTH light dominating a signal. An empty grasp baseline reading may also be recorded, and a, e.g., Spectral Angle Mapper (SAM) [31] similarity measure from hyperspectral imaging literature may be used to determine if a grasped object is proximal to a fiber end. Similarity may be scored from (0°, 90°) using the below Equation 1. However, systems and methods disclosed herein are not limited to a specific similarity measure; rather, any suitable measure known in the art may be used.

$$SAM(X, R) = \cos^{-1} \frac{\sum XR}{\sqrt{(\sum (X)^2 \sum (R)^2)}} \quad (1)$$

Referring to Equation 1 above, X may be a current fiber reading and R may be an empty reference signal. A SAM score may be compared against a threshold and a sample reading may only be used if readings are dissimilar. This approach can also be used to compare successful grasped samples with known spectral signatures. An exemplary complete grasping algorithm is given in Algorithm 1.

Algorithm 1 Multi-Point Spectral Data Acquisition

Input: integration time $\tau$, dark count calibration d, white reference calibration w, maximum grasp pressure $p_{max}$, empty grasp reading g, difference threshold $\delta$
Initialize:
   relay(f) ← LOW for all f ∈ Fiber Array
   $P_{applied}$ ← 0
   counts(f) ← 0 for all f ∈ Fiber Array
   N(f) ← 0, for all f ∈ Fiber Array
while $p_{applied} < p_{max}$ do
   for f ∈ Fiber Array do
      relay(f) ← HIGH
      raw_data ← read_spectrometer(f, $\tau$)

$$\text{cal\_data} \leftarrow \frac{\text{raw\_data} - d}{w - d}$$

if SAM(cal_data,g) > $\delta$ then
         counts(f) ← cal_data
         N(f) ← N(f) + 1
      end if
      relay(f) ← LOW
   end for
end while
return counts, N

VI. Demonstration

To demonstrate that a system is capable of collecting spectral data, three items of similar size, shape, and texture may be selected. Namely, items used may be a tennis ball, a polystyrene and plastic faux pear, and a polystyrene and plastic faux pomegranate. These items may be selected because current state-of-the-art waveguides would likely produce similar optical responses as a gripper conformed to a round object geometry. Using innervated fingers, a baseline empty grasp, where no object is held, may be collected (considered above in Algorithm 1 as g). For example, QTH lamps may be operated at 9.8 V: an empirically selected value from a bulb temperature study and from observed saturation of a spectrometer at higher operating voltages. Spectral response may be measured through embedded fibers with an integration time of 1.0 second per scan to ensure maximal absorption of light by a silicon detector. Including a switching time of 0.5 seconds, scan time over 9 sensors in three fingers may total 14 seconds. Readings may be scan averaged and normalized against, e.g., Spectralon total reflectance and dark signal calibrations samples. Results may be averaged across samples collected for each finger.

VII. Discussion

Figure 9:
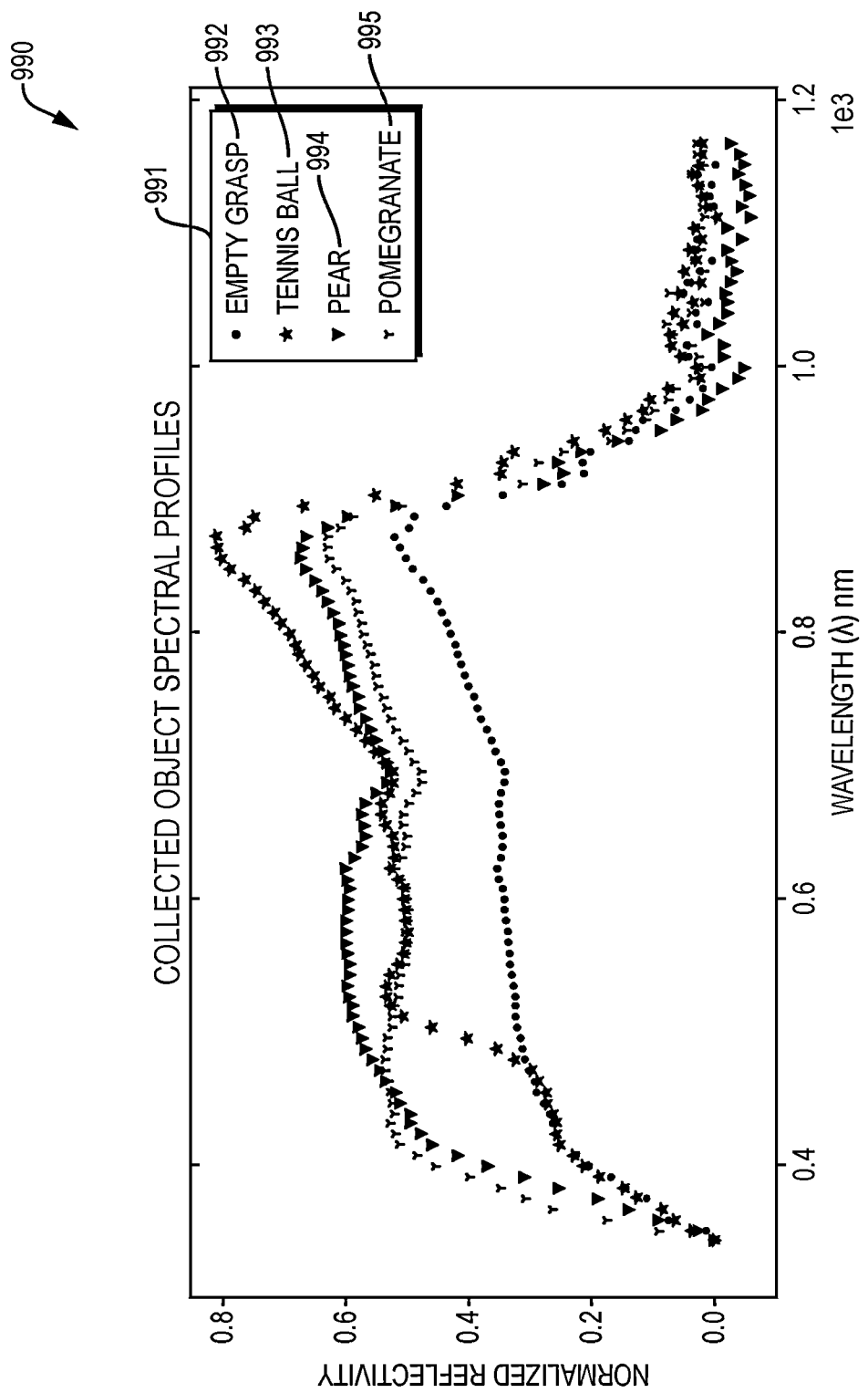
FIG. 9 is a graph of spectral profiles for collected object samples.

FIG. 9 is a graph of spectral profiles (empty grasp 992, tennis ball 993, pear 994, and pomegranate 995) for collected object samples using a gripper pad with normalized spectral reflectivity according to an example embodiment. Spectral profiles are shown in plot 990 in accordance with legend 991; as indicated by legend 991, points on the curve for empty grasp 992 are shown by dot icons, points on the curve for tennis ball 993 are shown by star icons, points on the curve for pear 994 are shown by solid triangle icons, and points on the curve for pomegranate 995 are shown by lined triangle icons. Curves may be averaged across an acquisition cycle using a single finger in a full contact position. Visually, from plotted spectral reflectivity curves in FIG. 9, it is seen how each item may have its own characteristic spectral curve as a function of a wavelength of incident light. Even for items of a same base material, namely a pear (profile 994) and a pomegranate (profile 995), varying mixtures of dyes and pigments may be sufficient to trigger a distinctive response. From 400 nm-700 nm, spectral profiles may show a significant divergence originating in a visible light portion of a spectrum. For example, a tennis ball profile 993 may show a dramatic increase between 500 and 600 nm, indicating a ball may have a strong yellow-green color profile. Spectral profiles at wavelengths less than 780 nm can be used for precise object color reconstruction, which itself might be a useful means to distinguish between multiple objects, or to understand a composition and quality of multiple instances of a same object class.

Spectral profiles shown in FIG. 9 can be used to implement the method 330, described hereinabove in relation to FIG. 3, to determine one or more properties of an object.

To provide such functionality, a system may include (not shown): a gripping element, a light source, a probe element, a spectrometer, and a processor. The gripping element may be configured to grasp an object. The light source may be configured to illuminate the object. The probe element may be operatively coupled to the gripping element. Further, the probe element may include an optical fiber (not shown) configured to transmit reflected light from the object. The spectrometer may be configured to: (i) receive the transmitted reflected light from the optical fiber and (ii) generate spectral data, e.g., as shown in plot 990, based on the received transmitted reflected light. The processor may be configured to: (i) receive the generated spectral data from the spectrometer and (ii) determine one or more properties of the object based on the received generated spectral data. Further, the light source may be a full spectrum light source. The processor may be further configured to measure a spectral profile, e.g., tennis ball 993, pear 994, and/or pomegranate 995, of the object based on the received generated spectral data. Further, the one or more properties may include one or more of color, composition, quality, class, material, contents, a chemical property, or a physical property. The processor may be further configured to determine the one or more properties of the object by comparing the spectral profile, e.g., tennis ball 993, pear 994, and/or pomegranate 995, of the object to a spectral signature in a database (not shown). For example, a spectral profile, e.g., tennis ball 993, pear 994, and/or pomegranate 995, may be compared with a known signature as described hereinabove with respect to Algorithm 1. The processor may be further configured to determine the one or more properties of the object based on the spectral data, e.g., as shown in plot 990, using a machine learning model (not shown). Further, the machine learning model may include a logistic model, a support vector machine, or a neural network. The machine learning model used may be as described in Hanson et al., "Pregrasp Object Material Classification by a Novel Gripper Design with Integrated Spectroscopy," *arXiv preprint*, 2022, pp. 1-7, which is herein incorporated by reference in its entirety.

At longer wavelengths, an NIR range, material properties may start to become more apparent. As observed in prior work, synthetic materials may exhibit a large peak in spectral intensity around 900 nm [25].

VIII. Conclusion

Systems and methods described herein provide a novel material-sensing capability for robotic grippers. Further, systems and methods provide a fabrication procedure to innervate an elastomeric gripper pad with flexible electronics and lensed fiber optic cables for measurement of material composition. Systems and methods described herein contribute a unique capability to recognize objects beyond shape, weight, and texture. Moreover, systems and methods demonstrate that spectroscopy provides a boon in both recognizing and understanding chemical-physical properties of in-hand objects.

Numerous applications exist for systems and methods described hereinabove. For example, systems and methods can distinguish between different types of plastic in a recycling product process line. Systems and methods described herein can also determine ripeness of fruit products via chemical composition, as well as perform other food processing. Likewise, systems and methods can identify parasites in fish fillets. Systems and methods described herein may be used in robots manipulating household objects and identifying grasped material types. Moreover, systems and methods provide opportunities for gentle handling of people in healthcare settings, for example by employing a prosthetic hand with soft gripping technology such as described hereinabove.

Figure 10:
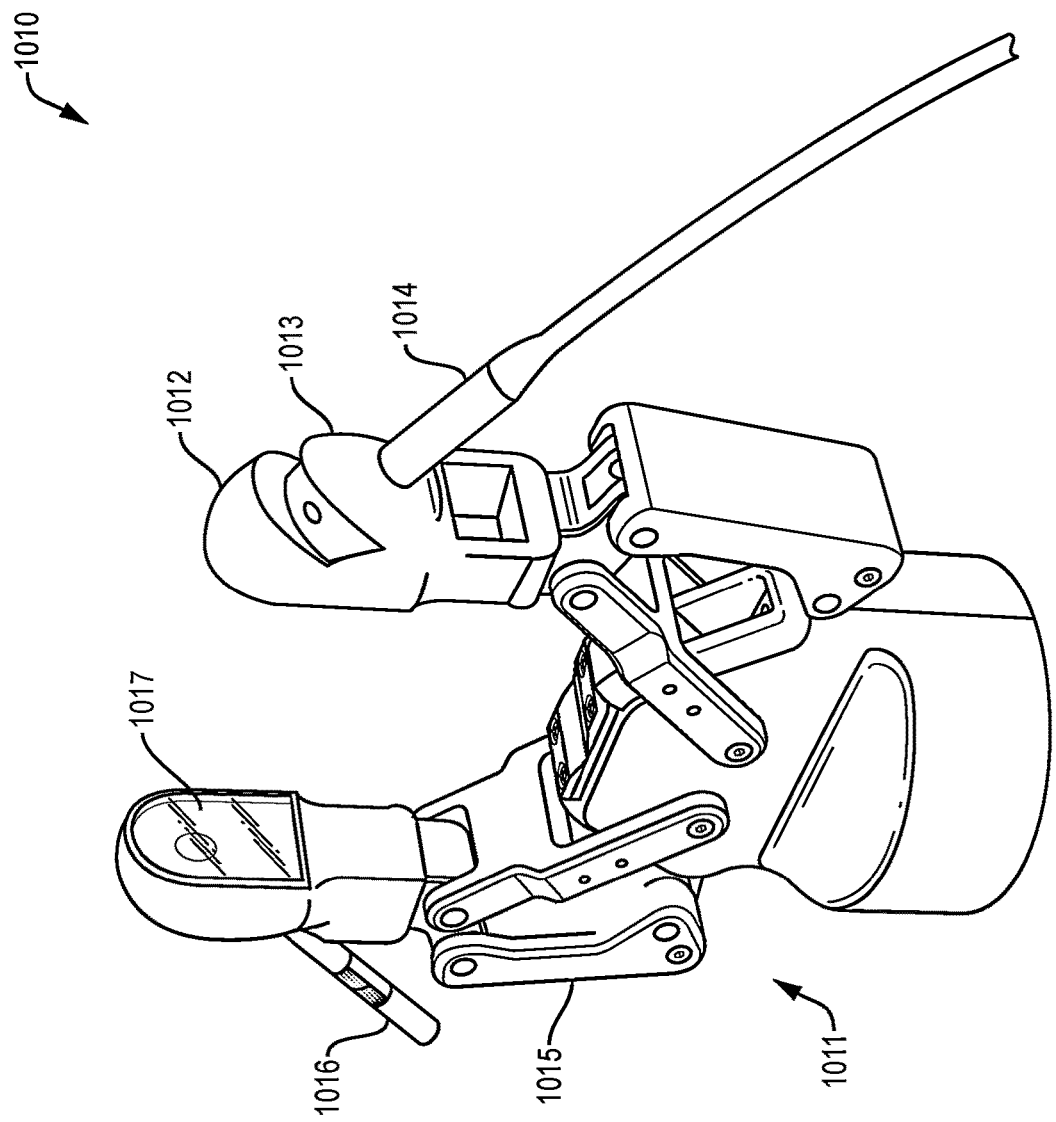
FIG. 10 is an image of a rigid gripper.

FIG. 10 is an image 1010 of a rigid gripper 1011. Rigid gripper 1011 may include carbon fiber fingertips 1012, collar clamps 1013, an endoscope attachment 1014 with camera and light ring, parallelogram drive mechanism 1015, VNIR fiber optic probe 1016, and optically clear elastomer 1017. An exemplary system may include a gripping element, e.g., rigid gripper 1011, that may be configured to grasp an object. In such a system, the gripping element, e.g., rigid gripper 1011, may include one or more rigid gripping fingers, e.g., carbon fiber fingertips 1012. Such a system may further include a light source, e.g., a light ring of endoscope attachment 1014. The light source, e.g., a light ring of endoscope attachment 1014, may be configured to illuminate an object. An exemplary system may further include a probe element, e.g., VNIR fiber optic probe 1016, operatively coupled to a gripping element, e.g., rigid gripper 1011. The probe element, e.g., VNIR fiber optic probe 1016, may include an optical fiber (not shown). In turn, the optical fiber may be configured to transmit reflected light from an object. Such an exemplary system may further include a spectrometer and a processor (not shown). The spectrometer may be configured to: (i) receive transmitted reflected light from an optical fiber and (ii) generate spectral data based on the received transmitted reflected light. The processor may be configured to: (i) receive generated spectral data from a spectrometer and (ii) determine one or more properties of an object based on the received generated spectral data. Rigid gripper 1011 can implement the method 330, described hereinabove in relation to FIG. 3, to determine one or more properties of an object. A rigid gripper according to systems and methods described hereinabove may be as described in Hanson et al., "Pregrasp Object Material Classification by a Novel Gripper Design with Integrated Spectroscopy," arXiv preprint, 2022, pp. 1-7, which is herein incorporated by reference in its entirety.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

IV. References

[1] J. Shintake, V. Cacucciolo, D. Floreano, and H. Shea, "Soft robotic grippers," *Advanced Materials*, vol. 30, no. 29, p. 1707035, 2018.

[2] G. Buckingham, J. S. Cant, and M. A. Goodale, "Living in a material world: how visual cues to material properties affect the way that we lift objects and perceive their weight," *Journal of neurophysiology*, vol. 102, no. 6, pp. 3111-3118, 2009.

[3] V. E. Abraira and D. D. Ginty, "The sensory neurons of touch," *Neuron*, vol. 79, no. 4, pp. 618-639, 2013.

[4] R. Li and E. H. Adelson, "Sensing and recognizing surface textures using a GelSight sensor," in *Proceedings of the IEEE Conference on Computer Vision and Pattern Recognition*, 2013, pp. 1241-1247.

[5] Z. Wang, Z. Li, B. Wang, and H. Liu, "Robot grasp detection using multimodal deep convolutional neural networks," *Advances in Mechanical Engineering*, vol. 8, no. 9, p. 1687814016668077, 2016.

[6] A. C. Abad and A. Ranasinghe, "Visuotactile sensors with emphasis on GelSight sensor: A review," *IEEE Sensors Journal*, vol. 20, no. 14, pp. 7628-7638, 2020.

[7] A. Alspach, K. Hashimoto, N. Kuppuswamy, and R. Tedrake, "Soft-bubble: A highly compliant dense geometry tactile sensor for robot manipulation," in 2019 *2nd IEEE International Conference on Soft Robotics (RoboSoft)*. IEEE, 2019, pp. 597-604.

[8] S. Serranti, A. Gargiulo, and G. Bonifazi, "Classification of polyolefins from building and construction waste using NIR hyperspectral imaging system," *Resources, Conservation and Recycling*, vol. 61, pp. 52-58, 2012.

[9] R. Kokaly, R. Clark, G. Swayze, K. Livo, T. Hoefen, N. Pearson, R. Wise, W. Benzel, H. Lowers, R. Driscoll, et al., "USGS Spectral Library Version 7 Data: U.S. Geological Survey data release," *United States Geological Survey (USGS): Reston, VA, USA*, 2017.

[10] B. M. Nicolai, K. Beullens, E. Bobelyn, A. Peirs, W. Saeys, K. I. Theron, and J. Lammertyn, "Nondestructive measurement of fruit and vegetable quality by means of NIR spectroscopy: A review," *Postharvest biology and technology*, vol. 46, no. 2, pp. 99-118, 2007.

[11] G. Schwartz and K. Nishino, "Recognizing material properties from images," *IEEE transactions on pattern analysis and machine intelligence*, vol. 42, no. 8, pp. 1981-1995, 2019.

[12] S. Bell, P. Upchurch, N. Snavely, and K. Bala, "Material recognition in the wild with the materials in context database," in *Proceedings of the IEEE conference on computer vision and pattern recognition*, 2015, pp. 3479-3487.

[13] R. W. Fleming, "Visual perception of materials and their properties," *Vision research*, vol. 94, pp. 62-75, 2014.

[14] H. Zhao, K. O'Brien, S. Li, and R. F. Shepherd, "Optoelectronically innervated soft prosthetic hand via stretchable optical waveguides," *Science robotics*, vol. 1, no. 1, p. eaai7529, 2016.

[15] C. B. Teeple, K. P. Becker, and R. J. Wood, "Soft curvature and contact force sensors for deep-sea grasping via soft optical waveguides," in 2018 *IEEE/RSJ International Conference on Intelligent Robots and Systems (IROS)*. IEEE, 2018, pp. 1621-1627.

[16] H. Bai, S. Li, J. Barreiros, Y. Tu, C. R. Pollock, and R. F. Shepherd, "Stretchable distributed fiber-optic sensors," *Science*, vol. 370, no. 6518, pp. 848-852, 2020.

[17] *Clear Silicone Encapsulating Rubber*, Smooth-On, Inc., 9 2021.

[18] *Dragon Skin Series Addition Cure Rubber Compounds*, Smooth-On, Inc., 4 2021.

[19] *Super-Soft, Addition Cure Silicone Rubbers*, Smooth-On, Inc., 2 2021.

[20] SYLGARD 186 *Silicon Elastomer*, The Dow Chemical Company, 2017, 11-1253-01 C.

[21] Z. Erickson, N. Luskey, S. Chernova, and C. C. Kemp, "Classification of household materials via spectroscopy," *IEEE Robotics and Automation Letters*, vol. 4, no. 2, pp. 700-707, 2019.

[22] Z. Erickson, E. Xing, B. Srirangam, S. Chernova, and C. C. Kemp, "Multimodal material classification for robots using spectroscopy and high resolution texture imaging," in 2020 *IEEE/RSJ International Conference on Intelligent Robots and Systems (IROS)*. IEEE, 2020, pp. 10 452-10 459.

[23] L. Nair, N. S. Srikanth, Z. M. Erickson, and S. Chernova, "Autonomous tool construction using part shape and attachment prediction," in *Robotics: Science and Systems*, 2019.

[24] V. Cortes, C. Blanes, J. Blasco, C. Ortiz, N. Aleixos, M. Mellado, S. Cubero, and P. Talens, "Integration of simultaneous tactile sensing and visible and near-infrared reflectance spectroscopy in a robot gripper for mango quality assessment," *Biosystems Engineering*, vol. 162, pp. 112-123, 2017.

[25] N. Hanson, T. Kelestemur, D. Erdogmus, and T. Padir, "Pregrasp object material classification by a novel gripper design with integrated spectroscopy," 2021, under peer review.

[26] M. B. Oliveira, A. Lurie, D. Ewen, P. Long, T. Padir, and S. M. Felton, "Hybrid fabrication of a soft bending actuator with casting and additive manufacturing," in *International Design Engineering Technical Conferences and Computers and Information in Engineering Conference*, vol. 59230. American Society of Mechanical Engineers, 2019, p. V05AT07A015.

[27] R. Pourdarbani, S. Sabzi, D. Kalantari, and J. I. Arribas, "Non-destructive visible and short-wave near-infrared spectroscopic data estimation of various physicochemical properties of fuji apple (*Malus pumila*) fruits at different maturation stages," *Chemometrics and Intelligent Laboratory Systems*, vol. 206, p. 104147, 2020.

[28] A. L. Jenkins, M. W. Ellzy, and L. C. Buettner, "Molecularly imprinted polymer sensors for detection in the gas, liquid, and vapor phase," *Journal of Molecular Recognition*, vol. 25, no. 6, pp. 330-335, 2012.

[29] M. H. Weik, "Spectral width," in *Computer Science and Communications Dictionary*. Boston, MA: Springer US, 2001, pp. 1633-1633.

[30] R. Jenkins, B. Aldwell, S. Yin, M. Meyer, A. Robinson, and R. Lupoi, "Energy efficiency of a quartz tungsten halogen lamp: Experimental and numerical approach," *Thermal Science and Engineering Progress*, vol. 13, p. 100385, 2019.

[31] X. Liu and C. Yang, "A kernel spectral angle mapper algorithm for remote sensing image classification," in 2013 *6th International Congress on Image and Signal Processing (CISP)*, vol. 2. IEEE, 2013, pp. 814-818.

What is claimed is:

1. A system for determining one or more properties of an object, the system comprising:
   a gripping element configured to grasp the object, the gripping element including one or more soft gripping fingers;
   a probe element including a gripper pad, the gripper pad (i) attached to a soft gripping finger of the one or more soft gripping fingers and (ii) embedded with a light source and at least a portion of an optical fiber, the soft gripping finger including an exoskeleton, the light source configured to illuminate the object and cause light to be reflected from a surface of the object, the optical fiber configured to convey the light reflected from the surface of the object;
   a spectrometer configured to: (i) receive, from the optical fiber, the light reflected from the surface of the object and (ii) generate spectral data based on the received light reflected from the surface of the object; and
   a processor configured to: (i) receive the generated spectral data from the spectrometer and (ii) determine one or more properties of the object based on the received generated spectral data.

2. The system of claim 1, wherein the probe element further includes a reflector and a lens at an end of the optical fiber, the lens being configured to focus the light reflected from the surface of the object onto the reflector and into the optical fiber.

3. The system of claim 1, wherein the gripper pad is an elastomeric gripper pad.

4. The system of claim 1, wherein the light source is a full spectrum light source.

5. The system of claim 4, wherein the full spectrum light source is a Quartz Tungsten Halogen lamp.

6. The system of claim 4, wherein the light reflected from the surface of the object includes wavelengths in a range of 350-2200 nm.

7. The system of claim 4, wherein the processor is further configured to measure a spectral profile of the object based on the received generated spectral data.

8. The system of claim 4, wherein the one or more properties comprise one or more of color, composition, quality, class, material, contents, a chemical property, or a physical property.

9. The system of claim 7, wherein the processor is further configured to determine the one or more properties of the object by comparing the spectral profile of the object to a spectral signature in a database.

10. The system of claim 7, wherein the processor is further configured to determine the one or more properties of the object based on the spectral data using a machine learning model.

11. The system of claim 10, wherein the machine learning model comprises a logistic model, a support vector machine, or a neural network.

12. The system of claim 1, wherein:
   the probe element further includes one or more auxiliary fibers;
   the system further comprises an optical switch operatively coupled to (i) the spectrometer and (ii) the optical fiber and the one or more auxiliary fibers, the optical switch being configured to switch among the optical fiber and the one or more auxiliary fibers;
   the spectrometer is further configured to: (i) receive auxiliary light reflected from the surface of the object and conveyed via the one or more auxiliary fibers and (ii) generate auxiliary data based on the received auxiliary light reflected from the surface of the object; and
   the processor is further configured to: (i) receive the generated auxiliary data and (ii) determine the one or more properties of the object based on one or more of the received generated spectral data and the received generated auxiliary data.

13. The system of claim 12, wherein determining the one or more properties of the object based on one or more of the received generated spectral data and the received generated auxiliary data comprises averaging one or more of the received generated spectral data and the received generated auxiliary data.

14. The system of claim 1, wherein the gripping element further comprises a prosthetic hand that includes the one or more soft gripping fingers.

15. A computer-implemented method for determining one or more properties of an object, the method comprising:
providing a gripping element configured to grasp the object, the gripping element including one or more soft gripping fingers;
providing a probe element including a gripper pad, the gripper pad (i) attached to a soft gripping finger of the one or more soft gripping fingers and (ii) embedded with a light source and at least a portion of an optical fiber, the soft gripping finger including an exoskeleton, the optical fiber configured to convey the light reflected from the surface of the object;
via the light source, illuminating the object and causing light to be reflected from a surface of the object;
receiving, from the optical fiber, the light reflected from the surface of the object;
generating spectral data based on the received light reflected from the surface of the object; and
determining one or more properties of the object based on the generated spectral data.

16. The method of claim 15, wherein determining the one or more properties of the object based on the spectral data comprises using a machine learning model.

* * * * *